Oct. 7, 1952 R. F. MORRISON 2,612,852
CANDY SLICING EQUIPMENT
Filed July 19, 1947 22 Sheets-Sheet 7
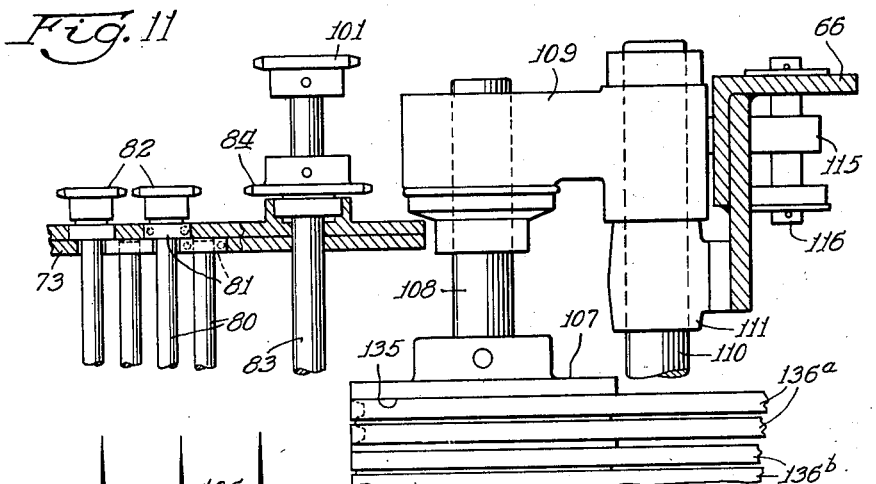
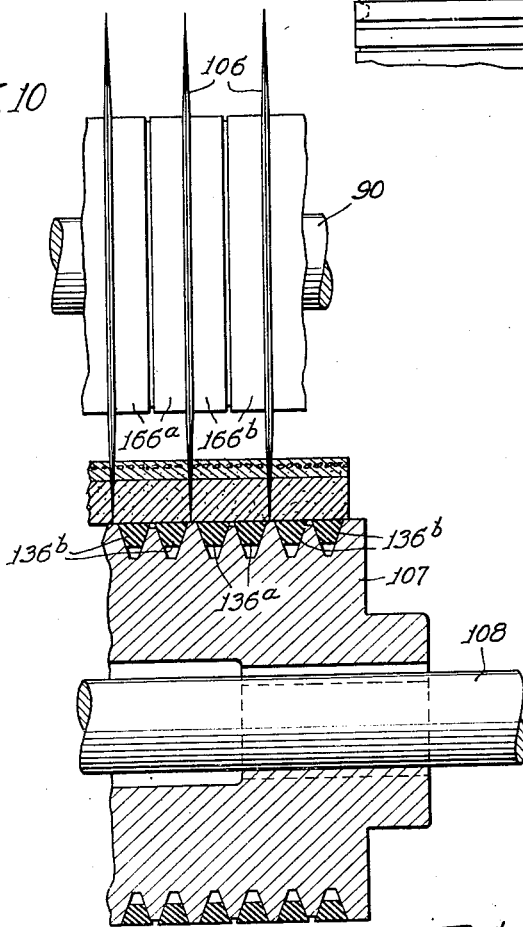
Inventor:
Robert F. Morrison
By: Zabel and Fritzbaugh
Attys.

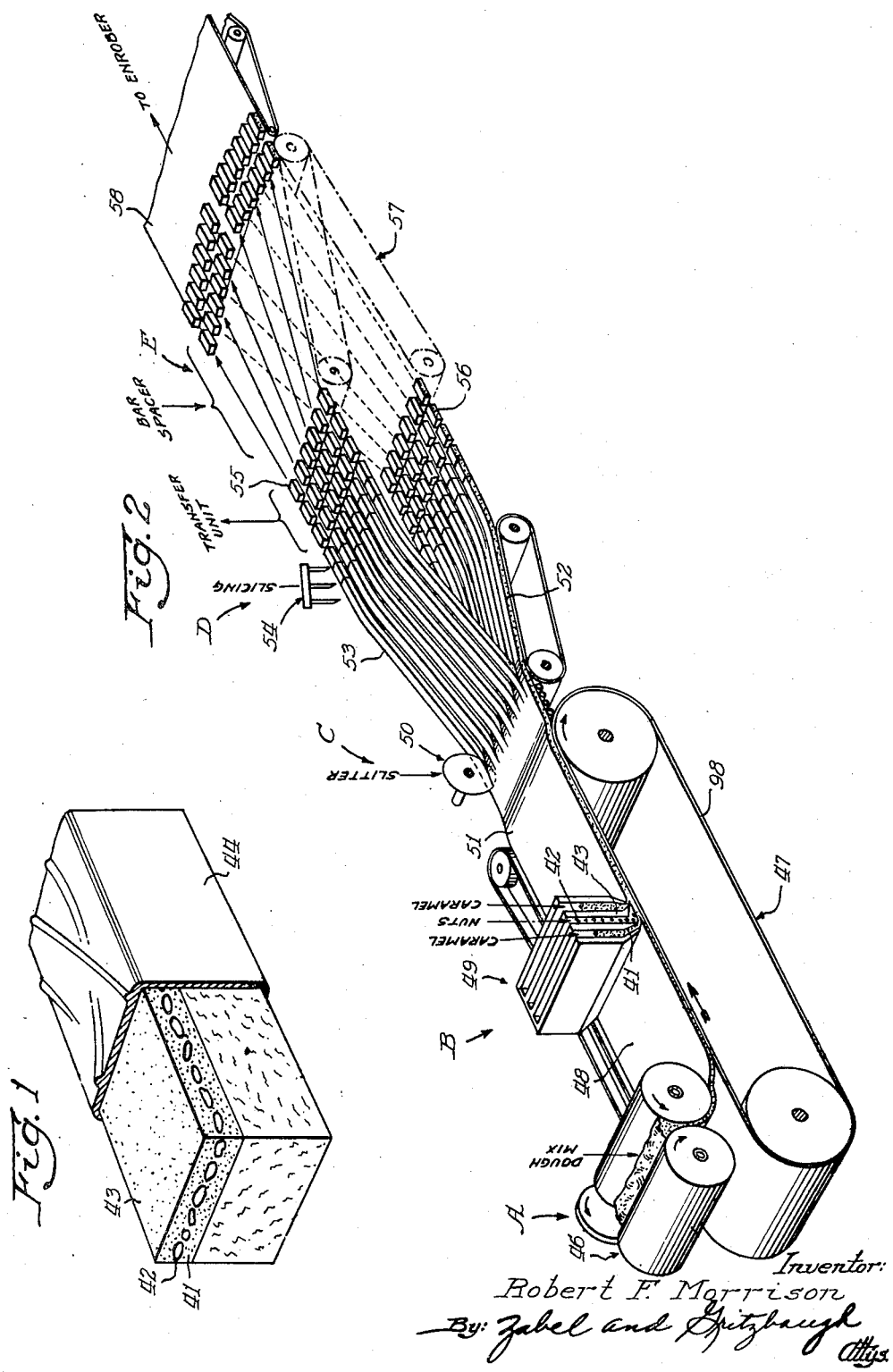

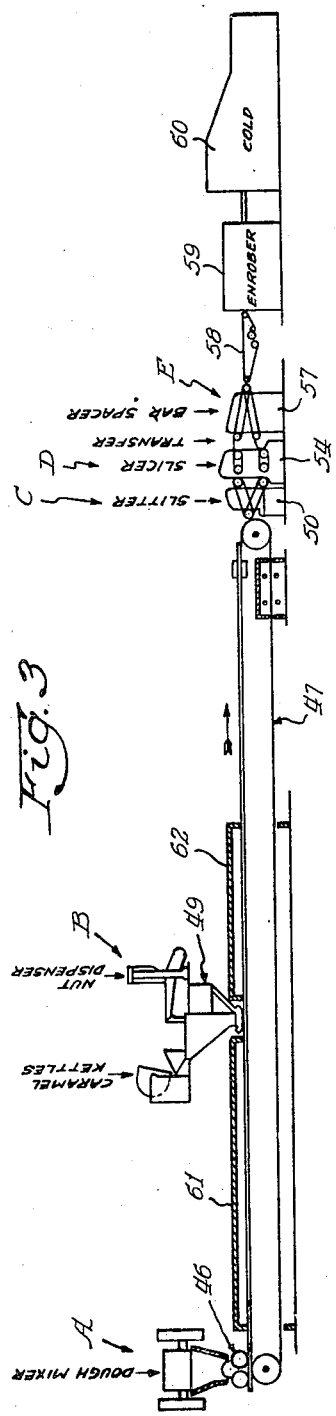
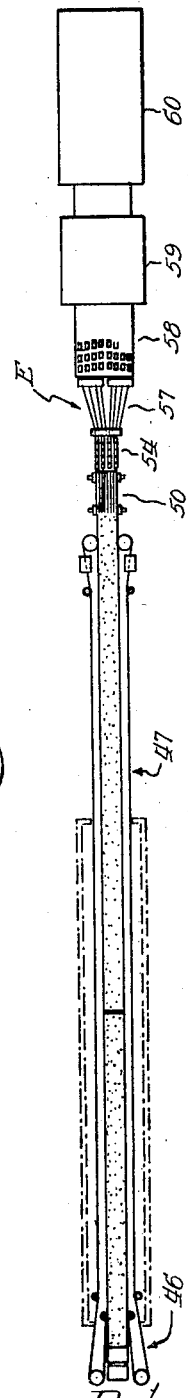
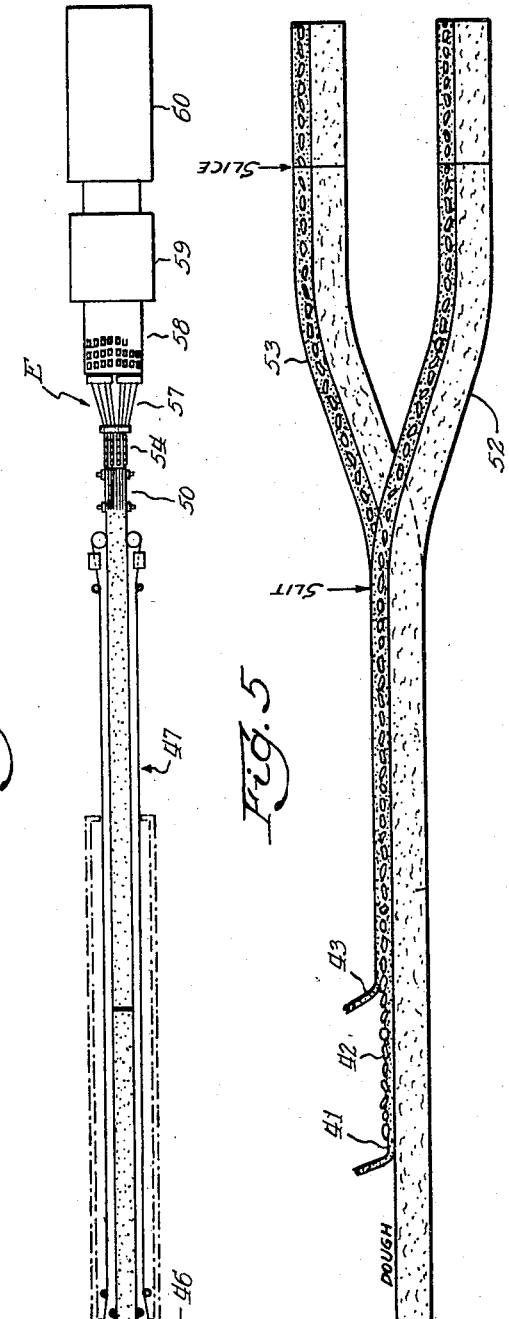

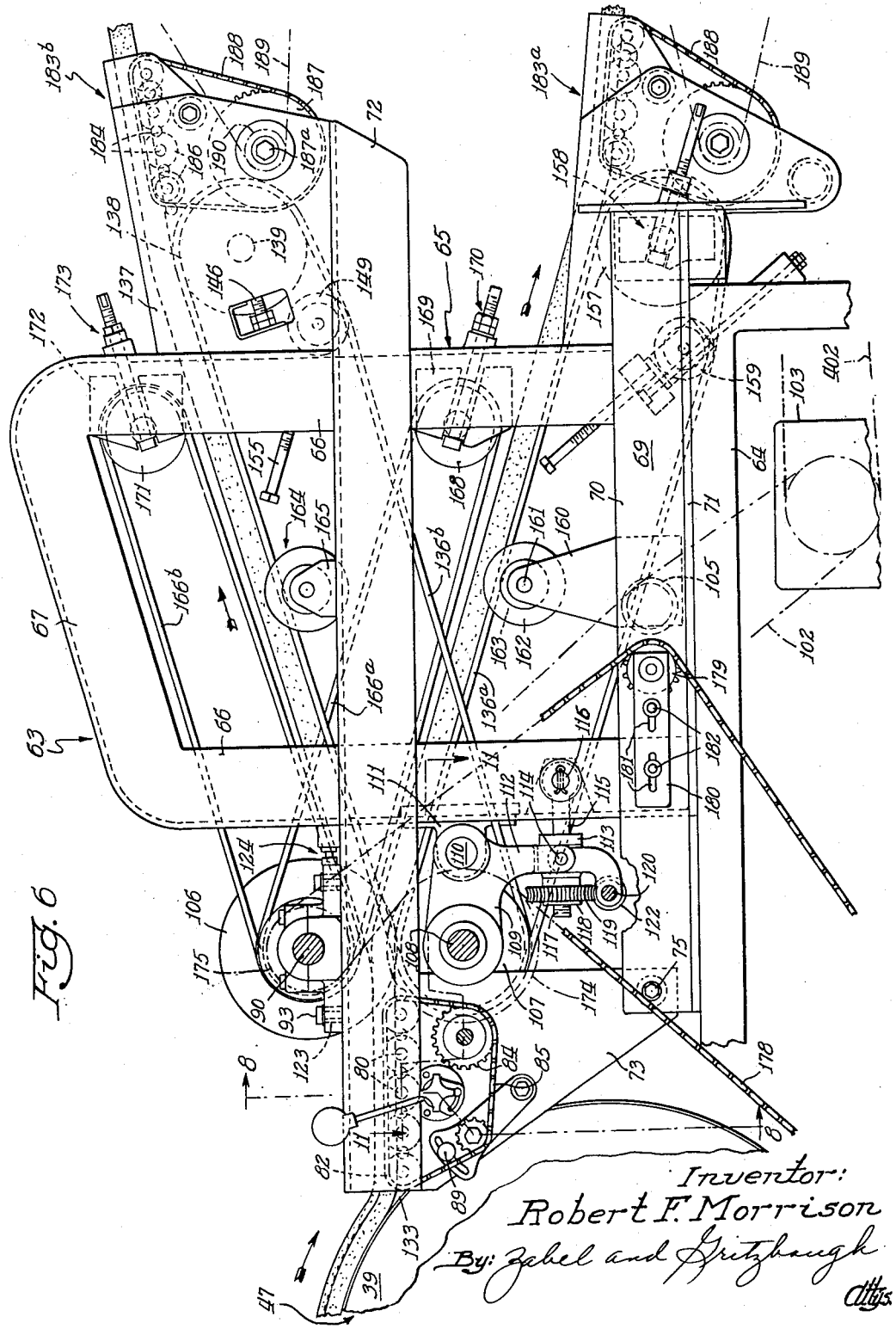

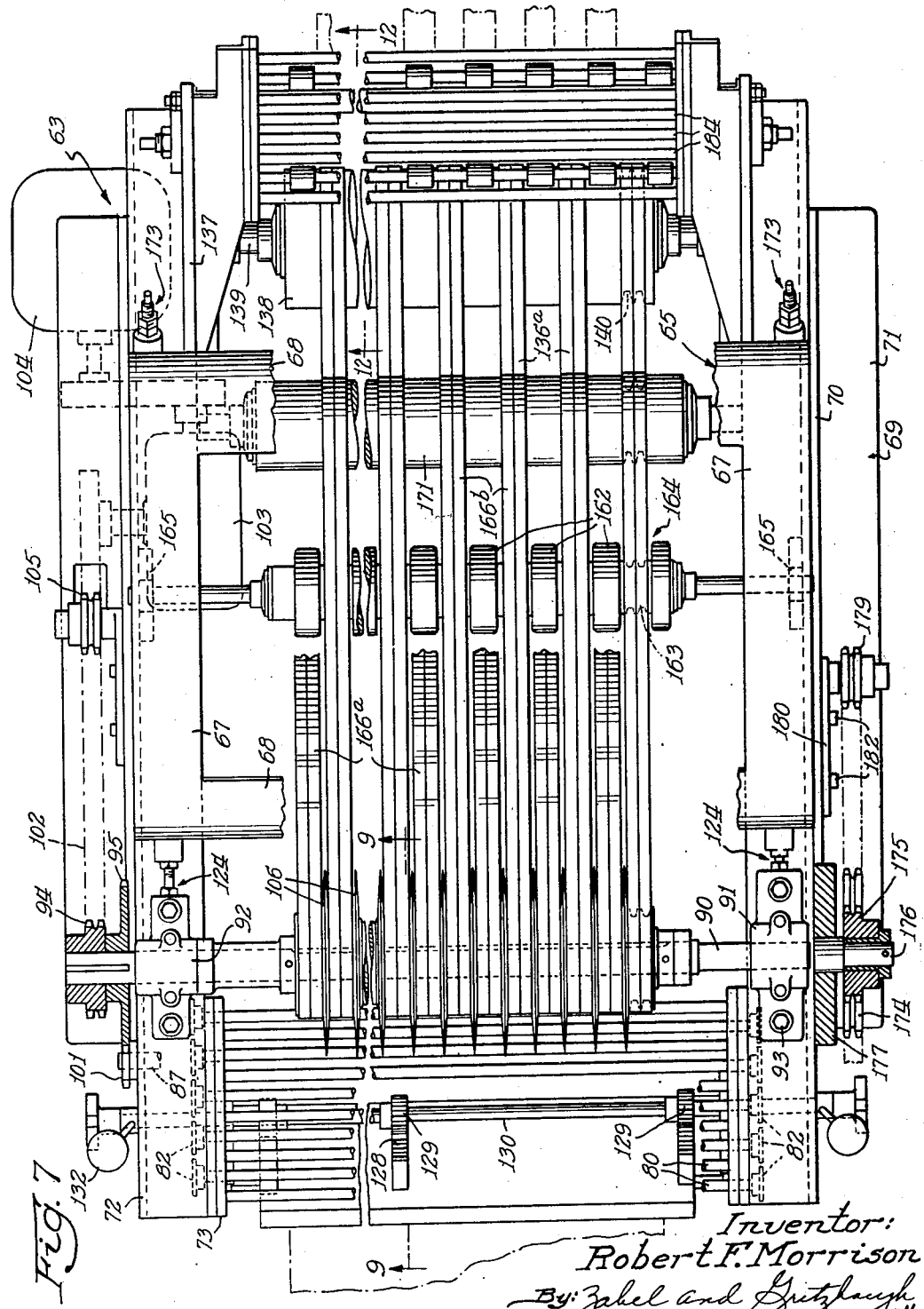

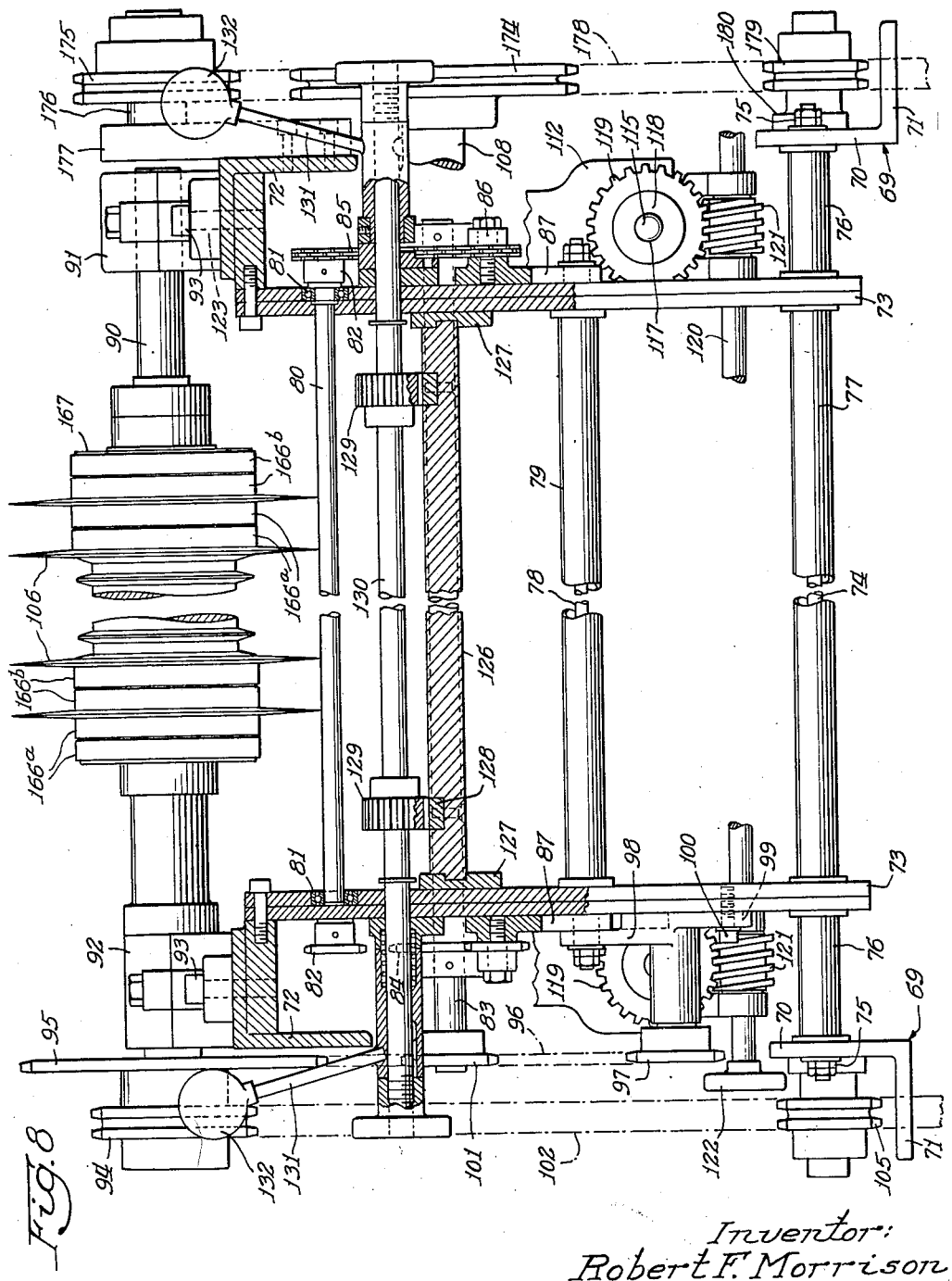

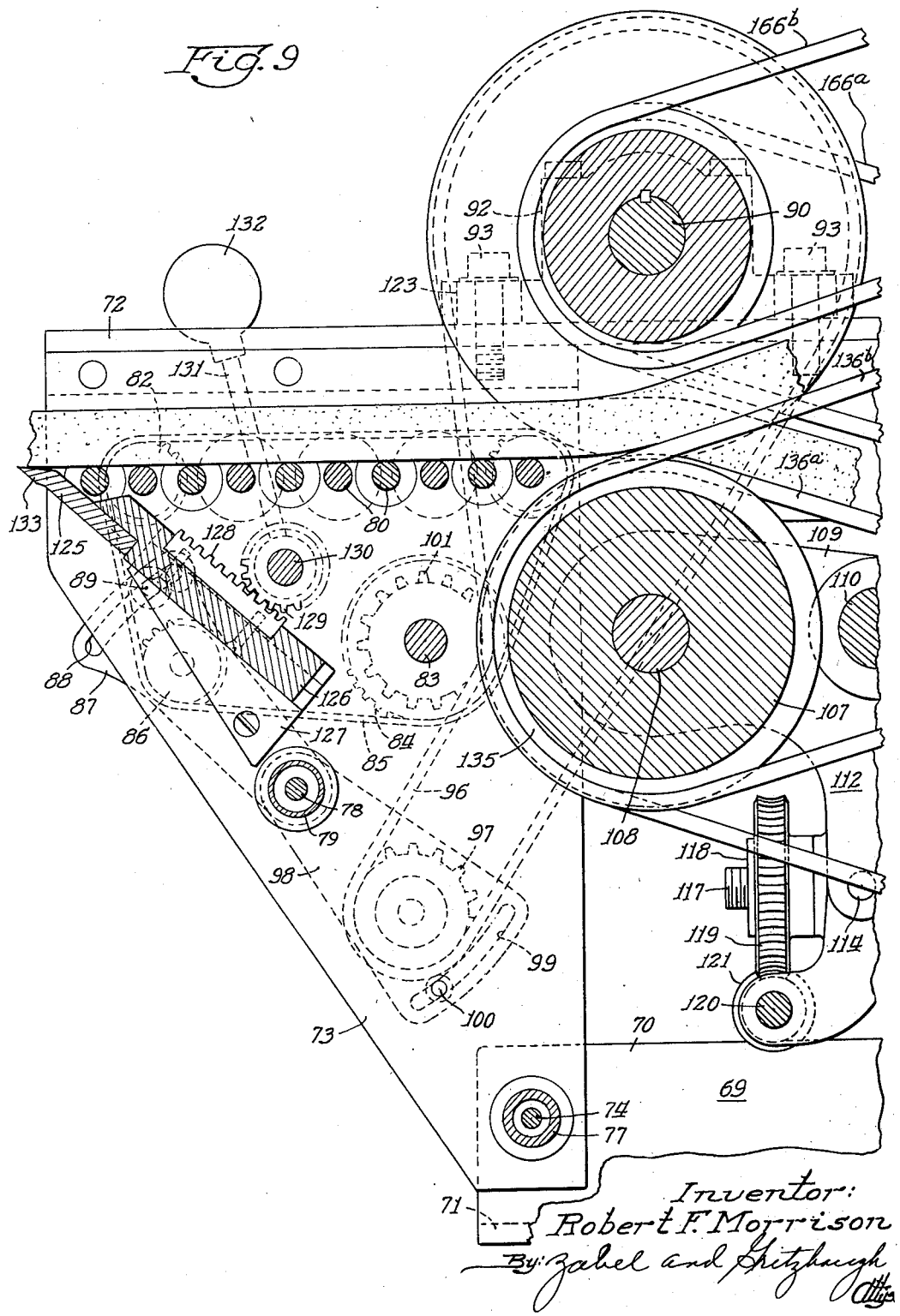

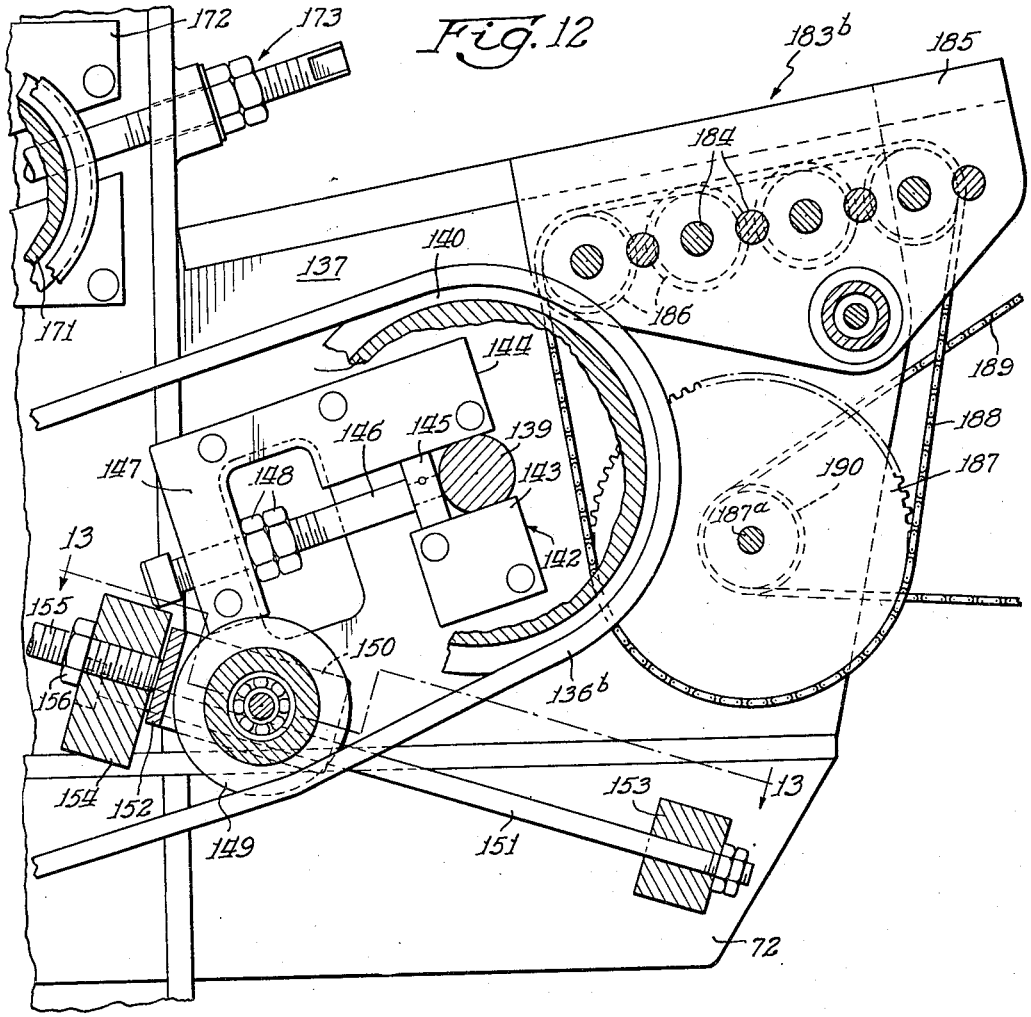
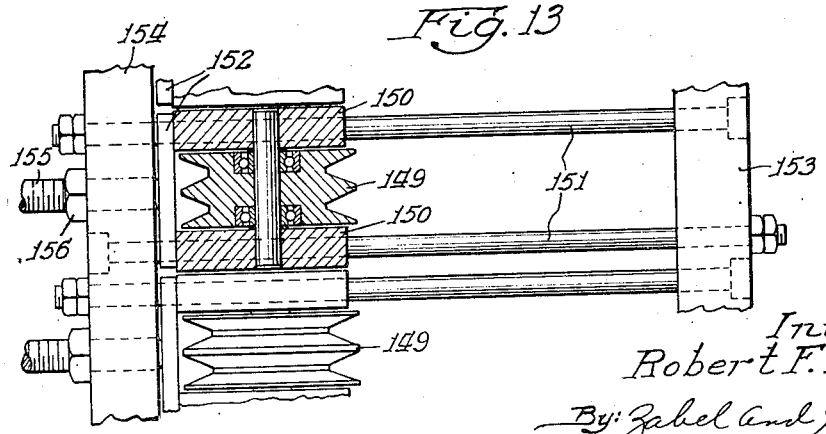

Oct. 7, 1952 R. F. MORRISON 2,612,852
CANDY SLICING EQUIPMENT
Filed July 19, 1947 22 Sheets-Sheet 9

Inventor:
Robert F. Morrison
By: Zabel and Fitzbaugh
Attys.

Oct. 7, 1952 R. F. MORRISON 2,612,852
CANDY SLICING EQUIPMENT
Filed July 19, 1947 22 Sheets-Sheet 10

Oct. 7, 1952 R. F. MORRISON 2,612,852
CANDY SLICING EQUIPMENT

Filed July 19, 1947 22 Sheets-Sheet 16

Inventor:
Robert F. Morrison
By: Zabel and Gritzbaugh
Attys.

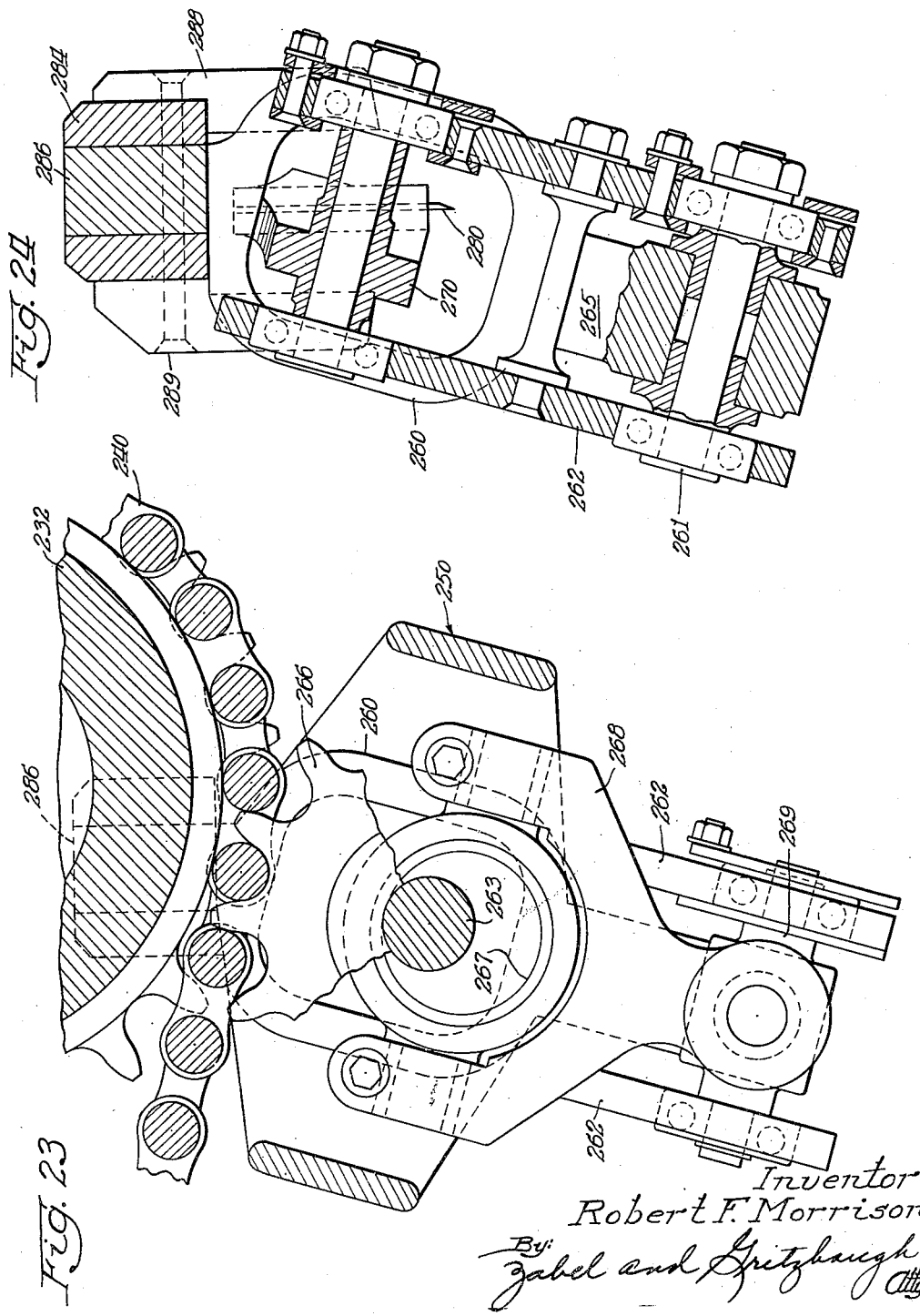

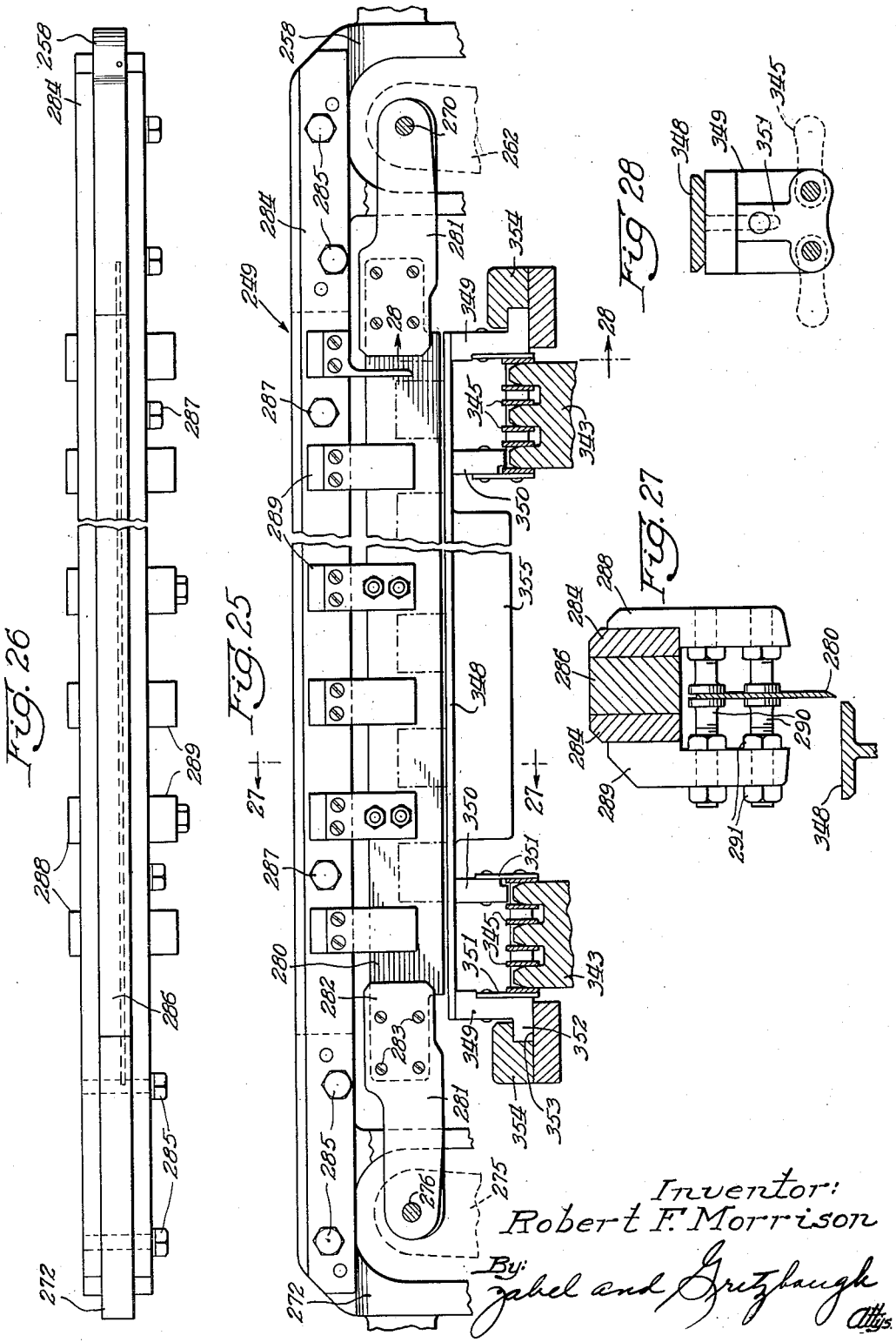

Oct. 7, 1952 R. F. MORRISON 2,612,852
CANDY SLICING EQUIPMENT
Filed July 19, 1947 22 Sheets-Sheet 19
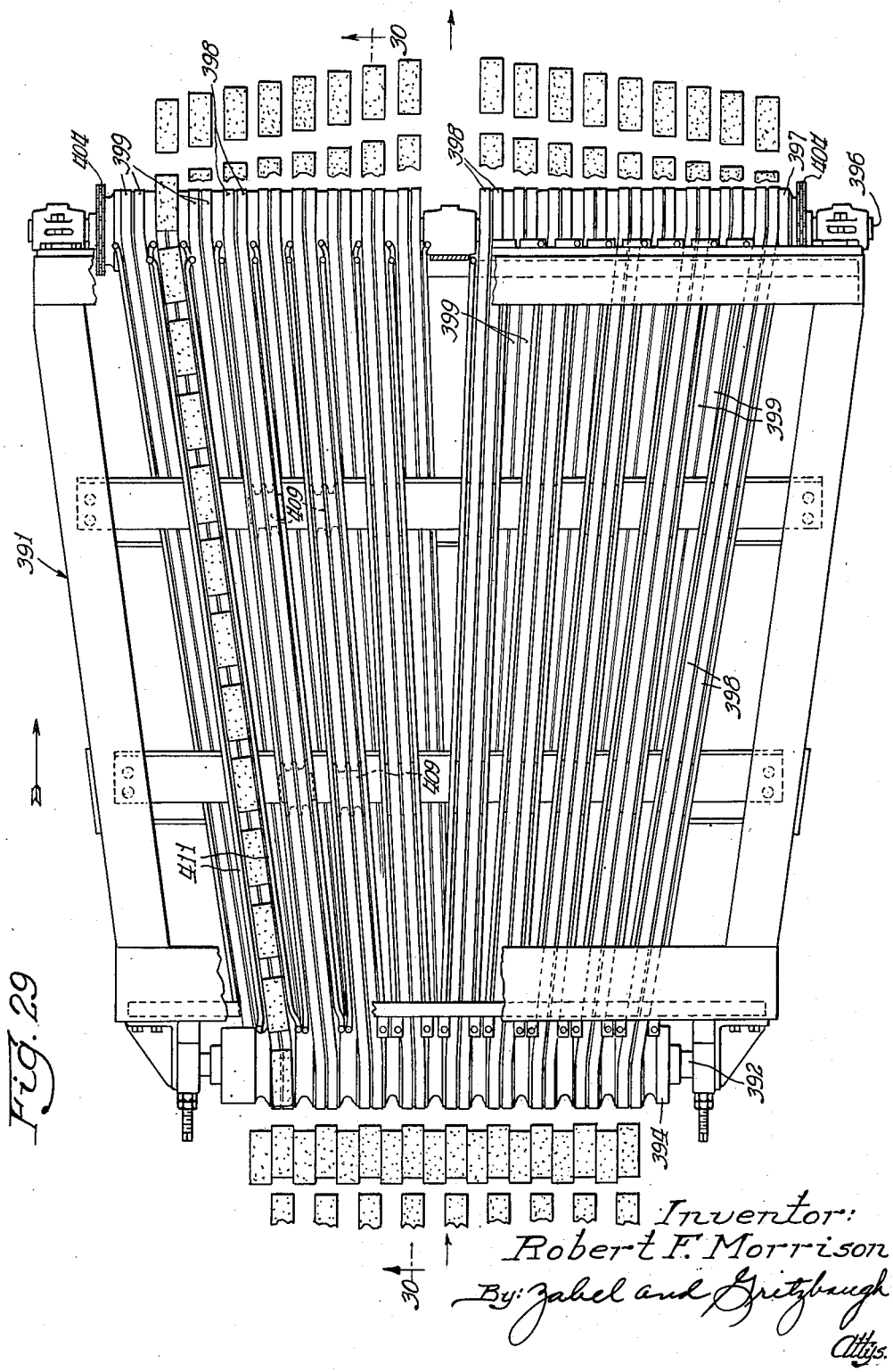

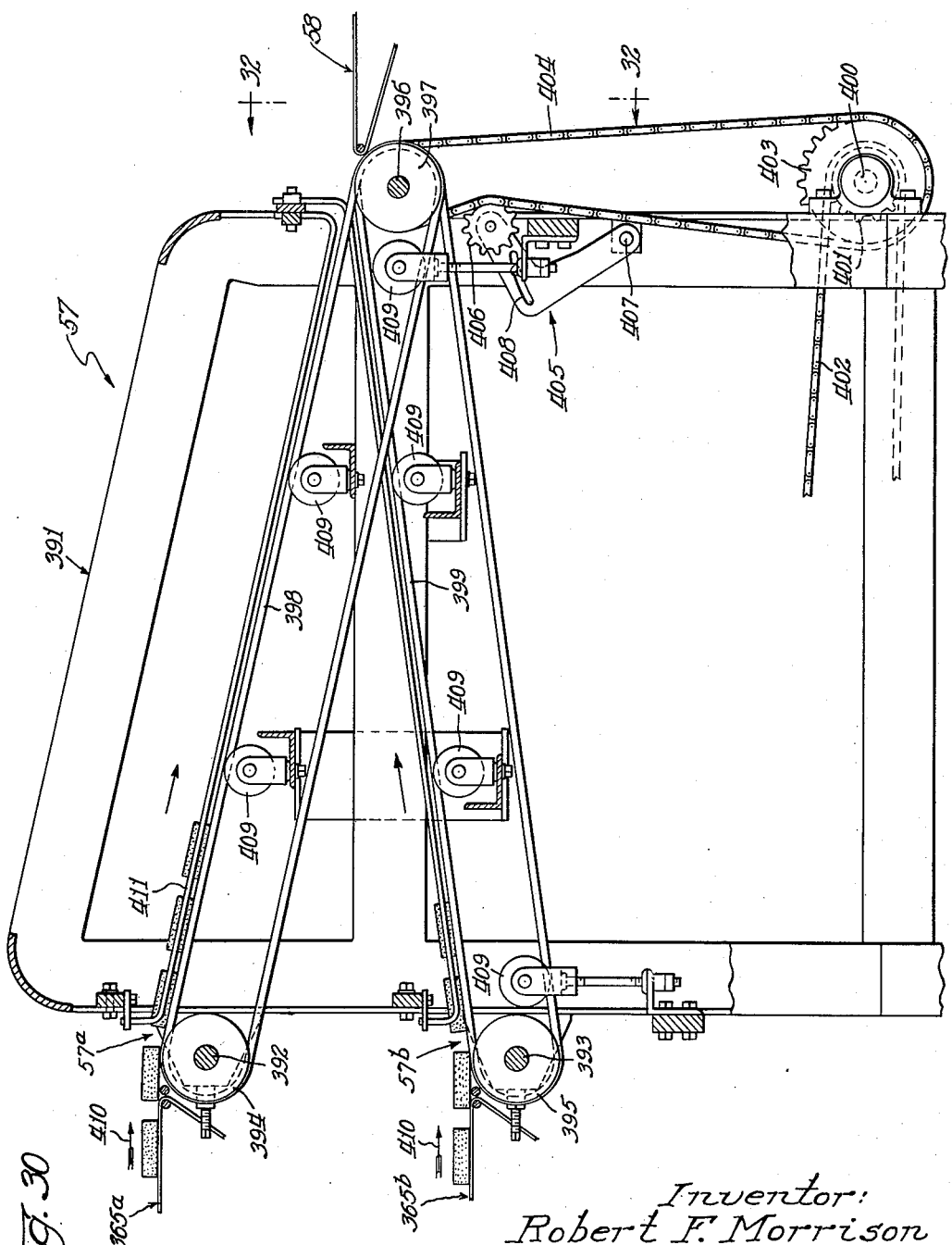

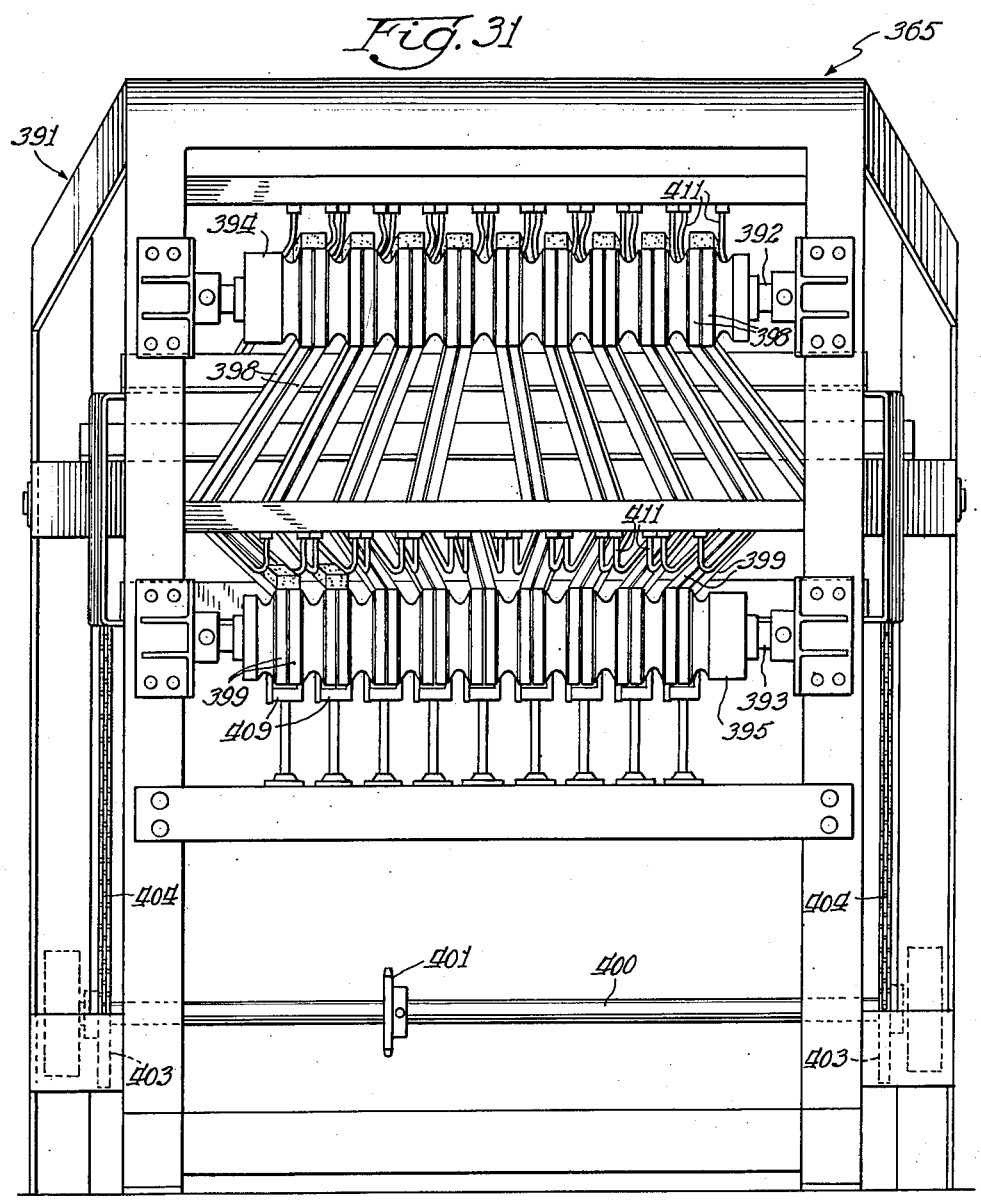

Oct. 7, 1952 — R. F. MORRISON — 2,612,852
CANDY SLICING EQUIPMENT
Filed July 19, 1947 — 22 Sheets-Sheet 22

Inventor:
Robert F. Morrison
By: Zabel and Fitzbaugh
Attys.

Patented Oct. 7, 1952

2,612,852

UNITED STATES PATENT OFFICE 2,612,852

CANDY SLICING EQUIPMENT

Robert F. Morrison, Oak Park, Ill., assignor to Mars, Incorporated, Chicago, Ill., a corporation of Delaware Application July 19, 1947, Serial No. 762,145

16 Claims. (Cl. 107—21)

The present invention is concerned with the manufacture of candy bars and relates primarily to the slitting and cutting into bar sizes a continuous sheet of candy. The invention contemplates that the candy dough is first prepared and thoroughly mixed and whipped in one or more batch mixers, or the like, and this dough is spread evenly in the form of a sheet onto a continuously moving table or belt. This sheet of candy may comprise numerous layers built up in the form of a unitary sheet that is fed at a uniform rate into the slitting and slicing units that make up the present invention.

As an object of the present invention it is intended to provide equipment that will effectively slit the sheet of candy into ribbons of uniform width corresponding to the desired widths of the candy bars and will then spread these ribbons and then cut them into bar lengths corresponding to the desired length of the candy bars.

It is further intended that these bars thus cut are then properly spaced both endwise and sidewise with respect to each other so that they may be coated with chocolate or the like. The present invention accomplishes this in an effective manner so as to produce uniformly sized candy bars of rectangular shape. The sides and ends of the candy bars thus produced are at right angles with the top and bottom faces, and this sliting and slicing is accomplished without defacing or distorting the resulting bars.

The present invention is particularly well suited for mass production methods requiring no handling of the candy sheets and bars.

The foregoing constitute some of the principal objects and advantages of the present invention, others of which will become apparent from the following description and the drawings, in which Fig. 1 is a perspective view showing a typical candy bar with a portion of the chocolate coating removed that can be made with the present invention;

Fig. 2 is a more or less schematic view illustrating the various stages through which the candy passes when manufactured in accordance with the present invention;

Fig. 3 is a diagrammatic view of the candy making equipment employing the present invention;

Fig. 4 is a plan view of the equipment shown in Fig. 3;

Fig. 5 is a more or less schematic side view of the candy illustrating the progress of the candy as it is being conveyed through the equipment forming the subject matter of the present invention;

Fig. 6 is a side elevational view of the slitter and separator that slits the sheet of candy into ribbons and spreads the ribbons into upper and lower elevations;

Fig. 7 is a plan view of the device shown in Fig. 6;

Fig. 8 is a vertical sectional view taken through the slitter, the view being taken on the line 8—8 of Fig. 6;

Fig. 9 is a longitudinal sectional view taken through the slitter, the view being taken on the line 9—9 of Fig. 7;

Fig. 10 is an enlarged fragmentary view showing the relationship between the slitter discs and the drum against which they cut, the drum being illustrated partly in section;

Fig. 11 is an enlarged horizontal sectional view taken along the line 11—11 of Fig. 6;

Fig. 12 is an enlarged vertical sectional view taken along the line 12—12 of Fig. 7;

Fig. 13 is a sectional view taken along the line 13—13 of Fig. 12;

Fig. 23 is an enlarged vertical sectional view taken along the line 23—23 of Fig. 20;

Fig. 24 is an enlarged fragmentary sectional view taken along the line 24—24 of Fig. 20;

Fig. 25 is a side elevational view of a knife and knife mount forming part of the slicer;

Fig. 26 is a plan view of the device shown in Fig. 25;

Fig. 27 is a vertical sectional view through the knife and knife mount, the view being taken on the line 27—27 of Fig. 25;

Fig. 28 is a vertical sectional view taken along the line 28—28 of Fig. 25;

Fig. 28a is a perspective view of the knife backing member illustrated in Fig. 20;

Fig. 29 is a plan view of the bar spacer that is disposed on the discharge side of the slicer;

Fig. 30 is a longitudinal sectional view taken along the line 30—30 of Fig. 29;

Fig. 31 is an end elevational view of the device shown in Fig. 30, the view being taken from the right end of the device of Fig. 30 looking toward the left;

Figure 14:
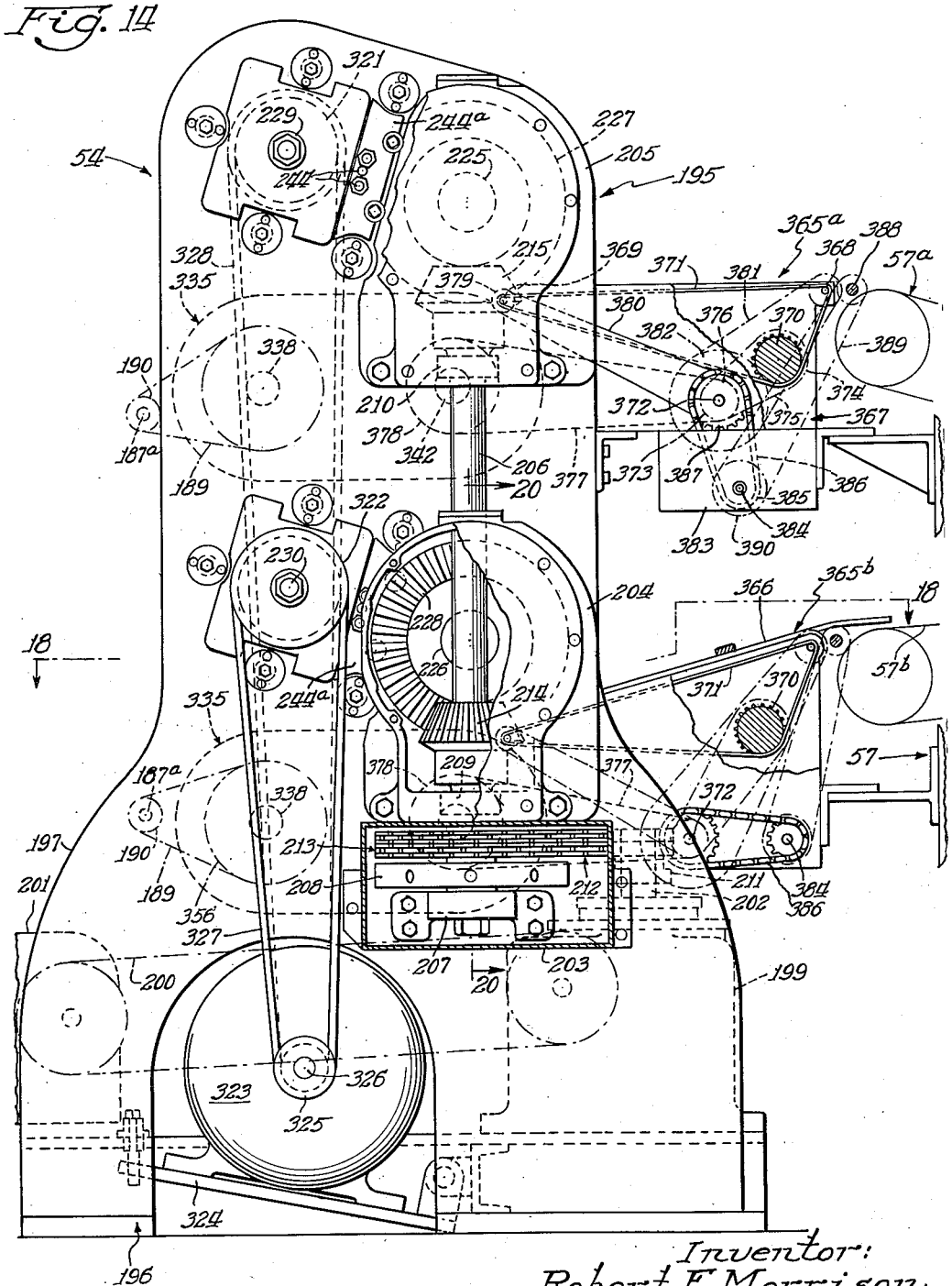
Fig. 14 is a side elevational view of the slicer, a portion being broken away and shown in section.

For purposes of illustration a specific embodiment of the present invention will be described, it being recognized that many modifications may be made in the form of the invention shown without departing from the intended scope of the invention.

The method and equipment described herein can be used to make candy bars comprising a wide variation of ingredients put together in accordance with many different formulae, such for example as caramel, toffee, marshmallow and nougat, or a combination of these materials. Specifically speaking, the nougat is a batter-like mix made of aerated egg whites and a syrup of sugar, salt, water and corn syrup; and after thoroughly beating this mix to provide additional aeration, vegetable oil, malted milk and cocoa are added and all are thoroughly mixed together. This nougat mix or dough is introduced through a spreader device generally indicated at 46. The operation of spreading this nougat onto a conveyor 47 is accomplished at station A and the nougat thus spread takes the form of a relatively wide sheet 48 of nougat that is of a predetermined uniform thickness throughout its entire area. The conveyor 47 moves this sheet 48 of nougat in the direction indicated by the arrow in Fig. 2.

At station B the two layers 41 and 43 (see Fig. 1) of caramel with the layer of nuts 42 held therebetween are laid on top of the sheet of nougat 48 by means of a caramel and nut dispenser generally indicated at 49 (see Figs. 2 to 5 incl.). The moving conveyor 47 thereafter carries combined layers of nougat, caramel and nuts 41 to 43 inclusive, into a plurality of slitting knives generally indicated at 50 where at station C, the combined sheet 51 of nougat, caramel and nuts is slit lengthwise into ribbon-like strips of candy 53 and 52, which are separated as shown in Fig. 2 into upper and lower strips.

As best shown in Fig. 2 the odd numbered strips, as for example, the first, third and fifth, etc., strips reading from right to left on the drawing are caused to travel downwardly and are identified as strips 52 whereas the even numbered strips, namely, second, fourth and sixth, etc., are caused to travel upwardly to an upper elevation and are identified as strips 53. This vertical separation of the strips is brought about so as to space the candy a sufficient distance apart to prevent the strips from sticking together again after they have passed the cutting discs.

The cutting discs do not remove any candy but merely slit and displace the candy in the separating operation. The strips are then cut into bar lengths, which operation is accomplished by means of a slicing machine generally indicated at 54 at station D. The bars thus cut are illustrated at 55 and 56 in Fig. 2, the former being disposed at the upper elevation and the latter bars are disposed at the lower elevation. These spaced and cut bars 55 and 56 leaving the slicer 54 are deposited on bar transfer units (labeled "Transfer Unit" in Fig. 2) shown at 365a and 365b in Fig. 14, and are then returned to a common plane on conveyor 58 by means of a bar spacer generally indicated at 57 at station E. The bar spacer not only returns the bars 55 and 56 to a common plane, but also spaces these bars so that they are deposited in the common plane with adjacent bars disposed at the proper distance apart for the chocolate enrobing operation to be performed. The bars leaving the slicer 54 are spaced apart endwise by the bar transfer units 365a and 365b that travel at a slightly greater speed than the previous conveyors. The conveyor 58 moves the bars to a chocolate coating or enrobing machine indicated at 59 in Fig. 3 from which the bars are conveyed through a suitable cooling chamber 60 and finally onto the bar wrapping equipment (not shown).

The nougat dough that is introduced onto the conveyor 47 at station A is necessarily warm and relatively soft so that the sheet 48 of nougat passing from station A to station B travels into a cooling chamber 61 (see Fig. 3) that chills and hardens to a certain extent the nougat preparatory to depositing the caramel and nut spread thereon at station B. Likewise the caramel and nut spread later deposited at station B is warm and relatively soft and therefore the candy leaving station B is caused to travel through a cooling chamber 62 before the candy is brought to the slitters at station C.

The combination nougat and caramel sheet leaving the cooling chamber 62 (Fig. 3) is conveyed by the conveyor 47 directly to the slitter where the sheet is first slit lengthwise into long strips or ribbons and then these strips are separated in a manner presently to be described. A device for effecting this slitting and separating of the caramel and nougat strips is known as a slitter and separator and is indicated at 63 in Fig. 6.

The details of the slitter and separator 63 are best shown in Figs. 6 to 13 inclusive. Referring to Figs. 6 to 9 inclusive the slitter and separator 63 is mounted on a base 64 and comprises generally a frame indicated at 65 that is mounted directly on the base 64 and includes upright legs 66 connected at their upper ends by side frame members 67 and forward and rear frame members 68 (Fig. 7). Adjacent to each side of the frame 65 and connected to the bottom of the legs 66 is an angle member 69. These angle members 69 are disposed in substantially horizontal spaced relationship and each comprises an upstanding web portion 70 and an outwardly projecting flange 71.

As best shown in Figs. 6 and 7 the frame member 65 is spaced from the roller 39 but lies in the horizontal direction of the conveyor 47. The angle members 70 project forwardly with respect to the frame 65 (Figs. 6 and 7) so as to span a substantial portion of the distance between the frame 65 and the adjacent roller 39 of the conveyor 47. Spaced above each of the angle members 69 and disposed in substantially parallel relationship therewith is an angle member 72 that is secured to the frame 65. These angle members 72 likewise extend beyond the forward edge of the frame 65 so as to span the distance between the frame 65 and the roller 39 of the conveyor 47. Thus there is provided a lower angle member 69 and an upper angle member 72 to each side of the frame 65 and to the forward ends of each pair of such lower and upper angle members is secured a vertically disposed plate member 73. Referring to Fig. 8 the plate members 73 are apertured through their lower edges to receive a rod 74 that extends between the spaced angle members 69 and is secured thereto by suitable bolts 75 that are threaded onto the ends of rod 74. Suitable spacer sleeves 76 are provided between the angle members 69 and the adjacent plate members 73 and a spacer sleeve 77 is provided between the pair of plate members 73 so as to fix the lower ends of the plate members 73 with respect to the angle members 69. These sleeves 76 and 77 are mounted over the rod 74. Disposed above the rod 74 is a second rod 78 that passes through the spaced plate members 73 and a spacer sleeve 79 is mounted over the rod 78 and serves to reinforce the plate members 73.

As best shown in Figs. 6 to 9 inclusive a plurality of horizontally spaced rotatable shafts serving as conveyor rollers 80 are mounted in bearings 81 (Fig. 8) in the spaced plate members 73. These rollers 80 are spaced relatively close together as indicated in Fig. 7 so as to form in effect a continuous conveyor that commences closely adjacent to the periphery of the roller 39 of conveyor 47 (Fig. 6) and extends horizontally in a direction toward the frame 65 of the slitter and separator 63. Each of the rollers 80 is provided on one of its ends with a sprocket wheel 82, and as shown in Fig. 7 the sprocket wheels 82 for the first, third, fifth, etc., rollers 80 are disposed at one side of the machine adjacent to one of the plate members 73, whereas the sprocket wheels 82 for the second, fourth, sixth, etc. rollers 80 are disposed at the other side of the machine adjacent to the other side of the plate member 73. In this manner adequate room is available for the sprocket wheels.

Journalled in the plate members 73 and disposed below the rollers 80 is a collar shaft 83 that carries a sprocket wheel 84 adjacent to each end thereof. Thus there is provided a powered sprocket wheel 84 for each set of sprocket wheels 82. A sprocket chain 85 is provided for each set of sprocket wheels 82 and engages each of such sprocket wheels as best shown in Fig. 9 and likewise operates about the corresponding powered sprocket wheel 84. An adjustable idler sprocket 86 is mounted on an adjustable plate 87 that is pivotally mounted on an end of the rod 78, there being provided a plate 87 for each idler sprocket 86. The sprocket chain 85 passes about the idler sprocket 86. The free end of each plate 87 is provided with a slot 88 that is adapted to slide on a lug 89 so that the relative position of the idler sprocket 86 may be adjusted to take up slack in the sprocket chain 85. Means associated with the lug 89 are provided for locking the plate 87 in a selected position.

Supported on the spaced angle members 72 is a shaft 90 that is journalled adjacent to its opposite ends in bearings 91 and 92. Each of the bearings 91 and 92 is mounted on an angle member 72 and is bolted in place as by bolts 93. One end of the shaft 90 terminates at the bearing 91, while the opposite end of the shaft projects through the bearing 92 and is provided with a double sprocket wheel 94 on the end thereof. A second sprocket wheel 95 is mounted on the shaft 90 between the double sprocket wheel 94 and the bearing 92. Again referring to Figs. 8 and 9 a sprocket chain 96 is adapted to operate about the sprocket wheel 95 and likewise meshes with a sprocket wheel 101 that is mounted on the end of shaft 83. An idler sprocket 97 is journalled on a plate 98, this plate 98 being pivotally mounted on the end of rod 78. An arcuate slot 99 is provided in the plate 98 and is adapted to ride on a lug 100 so that the plate 98 may be pivoted about the rod 78 so as to adjust the position of the idler sprocket 97, the position of the plate 98 being fixed by locking means cooperating with the lug 100. The sprocket chain 96 operates about the idler sprocket 97 and the tension in the chain is adjusted by the position of the idler sprocket 97.

Thus the powered sprocket wheel 84 is rotated by the drive through sprocket chain 96 and sprocket wheel 101 so as to rotate the numerous rollers 80 through the operation of the sprocket chains 85. The sprocket chain 96 is powered through the sprocket wheel 95 by rotation of shaft 90. This rotation of shaft 90 is brought about by a double sprocket chain 102 that operates over the double sprocket wheel 94, this double sprocket chain 102 being powered through a speed reducer 103. The speed reducer 103 in turn is driven by a motor 104. The tension in the sprocket chain 104 is adjusted by an adjustable idler sprocket 105.

As best shown in Figs. 6 to 10 inclusive a plurality of slitting discs 106 are mounted on the shaft 90 and are fixed to the shaft so as to rotate therewith. These slitting discs 106 are uniformly spaced apart along the shaft 90, their spacing being in accordance with the desired width of the strips or ribbons that are to be cut from the combination nougat and caramel sheet that is fed into the slitter and separator. Mounted directly below the slitting discs 106 is a cutting drum 107 that is mounted on a shaft 108. This shaft 108 is journalled at its opposite ends in plate members 109, each of which plate members 109 is pivotally mounted as at 110 (see Fig. 6) on a bracket 111 that is carried on the frame 65. The plate member 109 has a downwardly projecting arm 112 that is bifurcated to receive a collar 113, the arm 112 being pivotally mounted as at 114 on the collar 113. Passing through the collar 113 is a stud shaft 115 that is pivoted at one end at 116 on a horizontal shaft that is mounted on the machine frame. The stud shaft 115 is threaded as at 117 on the other end thereof. Threaded onto the end 117 of the stud shaft 115 is a rotatable collar 118 that carries a worm wheel 119. Disposed below the worm wheel 119 is a rotatable shaft 120 that is supported in the plate member 73 (see Fig. 8) and carries a pair of worms 121, one being disposed in operative relationship with each of the worm wheels 119. The worms 121 are fixed with respect to the shaft 120 so that upon rotation of shaft 120 both worms 121 drive the worm wheels 119. A hand knob 122 is mounted on one or both ends of the shaft 120 and is adjustable for hand manipulation from the side of the device. Thus by rotating the hand knob 122 both worm wheels 119 are rotated through the worms 121 so as to move the collar 118 longitudinally along the stud shaft 115. This motion of the collar 118 along the stud shaft 115 causes the cutting drum 107 to move toward or away from the slitting discs 106 so as to permit adjustment of the position of the cutting drum 107 with respect to the slitting discs 106. As best shown in Fig. 10 it is desirable that the cutting edge of the discs 106 be in engagement with the periphery of the cutting drum 107. The drum 107 may be made of aluminum or some such material, whereas the slitting discs 106 are made of steel so that in practice it may be advisable for the slitting discs 106 to actually cut into the surface of the cutting drum 107.

The bearings 91 and 92 (Figs. 6 to 9 inclusive) as previously mentioned are mounted on the angle framing members 72 and are actually bolted in place as at 93. Each of the bolts 93 passes through an elongated hole 123 in its respective bearing member so that the position of both bearing members 91 and 92 may be adjusted longitudinally along the angle framing members 72. Thus the position of the slitting discs 106 over the cutting drum 107 may be adjusted and adjustable stop members 124 (Figs. 6 and 7) may be provided to assist in locking the bearing members in place after this adjustment has been made.

As shown in Fig. 6 the rollers 80 at the forward end of the slitter and separator 63 are disposed closely adjacent to the roller 39 at the exit end of the conveyor 47. When the leading edge of a sheet of candy is first conveyed from the conveyor 47 onto the slitter and separator 63 it is necessary to direct the leading edge onto the rollers 80 and for this purpose a feeder strip 125 (see Fig. 9) is provided. This feeder strip 125 is disposed crosswise between the spaced plate members 73 (Fig. 8) and is mounted on a slidable plate 126. This plate 126 is slidably mounted in spaced grooved members 127 that are mounted on the plates 73. As best shown in Fig. 9 the slidable plate 126 is provided with a rack 128 that engages a pair of pinions 129 (Figs. 8 and 9), which pinions 129 are mounted on a rotatable shaft 130 that is journalled in the spaced plates 73. An operating lever 131 is fixed to the shaft 130 and is provided with a knob 132 on its upper end. Thus by moving operating lever 131 in a clockwise direction (see Fig. 9) the feeder strip 125 is moved upwardly and is provided with a spanning portion 133 that spans the distance between the first roller 80 and the periphery of the belt conveyor 47 (see Fig. 6). After the leading edge of the candy strip has been moved on the rollers 80 the operating lever 131 can be rotated into a counterclockwise direction so as to lower the feeder strip 125 to an out-of-the-way position.

Referring now to Figs. 6, 9 and 11 the cutting drum 107 is provided with grooves 135 throughout its length so as to provide pulleys for a plurality of pairs of V-belts 136a and 136b. At the right hand end of the angle members 72 (see Figs. 6, 7 and 12) are upstanding upright supporting plats 137 between which is mounted a drum 138. This drum 138 has its ends mounted on a shaft 139 and is grooved as at 140 to accommodate the pairs of belts 136b. Thus these pairs of belts 136b are adapted to operate about the lower and upper drums 107 and 138 respectively. As best shown in Fig. 12 the shaft 139, upon which is mounted the upper drum 138 is supported in adjustable bearings, one of which is generally indicated at 142. Each of these bearings 142 comprises spaced bearing members 143 and 144 engaging flattened portions on the ends of shaft 139 which protrude from the ends of drum 138, both of which are stationary and secured to the inner face of plate 137, and an adjustable bearing portion 145. This adjustable bearing portion 145 is mounted on the end of an adjustment screw 146 that is carried in an arm 147 that is formed as an integral part of the upper bearing portion 144. Adjustment nuts 148 fix the relative position of the movable bearing portion 145 so that the spacing of the shaft 139 with respect to the shaft 108 (see Fig. 6) can be adjusted by manipulation of the adjusting screw 146 and the locking nuts 148.

Each pair of belts 136b is provided with an idler pulley 149 that is mounted between a pair of spaced blocks 150 (Fig. 13) that are adapted to slide longitudinally along a pair of guide and supporting rods 151. The spaced blocks 150 are connected along their upper edges by a plate 152, the rods 151 passing through the apertures in the blocks 150 and the connecting plate 152. Framing members 153 and 154 support the lower and upper ends respectively of the rods 151. The lower framing member 153 is connected to the spaced angle members 72, whereas the upper framing member 154 is supported between upright legs 66 of the frame 65 (see Fig. 6). An adjusting screw 155 is threaded into the framing member 154 and projects beyond the framing member so as to engage the connecting member 152 (Fig. 13). Thus each pulley 149 may be moved longitudinally along these supporting rods 151 by adjustment of its screw 155 thereby adjusting the pressure of each idler pulley 149 against its respective pair of belts 136b (see Fig. 12). A nut 156 on the adjusting screw 155 locks the position of the screw after the adjustment has been made.

The drum indicated at 157 in Fig. 6 is journalled between the angle members 69 at a position below the upper drum 138. This lower drum 157 is grooved so as to provide a support for the plurality of pairs of belts 136a in a manner similar to the upper support for the belts 136b. This lower drum 157 is likewise adjustable by means applied by a mechanism generally indicated at 158, but since this mechanism is similar in operation to the adjustable bearing indicated at 142 in Fig. 12 a more complete description is believed unnecessary. Thus the lower belts 136a are carried between upper and lower drums 107 and 157 and a plurality of idler pulleys 159 are provided to adjust the tension in the belts 136a. These lower idler pulleys 159 are similar to the upper pulleys 149 described in connection with Fig. 12 and are likewise adjustable as previously described.

Thus there are provided upper and lower conveyor belts 136b and 136a respectively, they being arranged so that alternate pairs of belts are inclined upwardly and downwardly respectively.

As best shown in Figs. 6 and 7 a supporting bracket 160 is fastened to each of the longitudinal angle members 69 and a rotatable shaft 161 is journalled in these spaced brackets 160. Mounted on the shaft 161 are a plurality of guide rollers 162 and these guide rollers are spaced between the pairs of belts 136a. Between each pair of guide rollers 162 is a V-notched drum portion indicated in Fig. 7 at 163 upon which the corresponding pair of V-belts 136a is adapted to ride. Thus there is provided a support with guides for the V-belts 136a in the region substantially midway between their opposite end supports. Similarly an intermediate support and guide member generally indicated at 164 is provided for the upper V-belts 136b, this member being supported on spaced brackets 165 that are mounted on the upper spaced angle members 72.

Mounted above the V-belts 136a and 136b are cooperating guide belts 166a and 166b. The guide belts 166a and 166b are mounted at one end over pulley drums 167 (Fig. 8) that are mounted on the shaft 90 and are disposed with one pulley drum 167 disposed between each pair of adjustable slitter discs 106. Each alternate pulley drum 167 is grooved to receive a pair of guide belts 166a. The lower ends of the guide belts 166a are supported by a drum 168 (see Fig. 6) that is journalled in adjustable bearing members 169 that are mounted on the frame 65. The bearing members 169 are provided with take-up provisions including the adjusting mechanism 170 that is similar to the adjustable mechanism illustrated by members 145 to 148 inclusive in connection with Fig. 12. Thus the relative spacing between the lower drum 168 and the upper shaft 90 can be adjusted so as to insure proper tension in the guide belts 166a.

Similarly the upper guide belts 166b are supported at their lower ends on the remaining pulley drums 167 that are carried on the shaft 90 and the upper ends of these guide belts 166b are supported on a drum 171 that is mounted in adjustable bearings 172 adjacent to the top of the frame 65. These adjustable bearings 172 are likewise provided with a tension mechanism 173 for adjusting the tension in the belts 166b.

The relationship of the guide belts 166a and conveyor belts 136a is such that there is a pair of guide belts 166a disposed directly over each pair of V-belts 136a. Similarly there is provided a pair of guide belts 166b directly over each pair of V-belts 136b.

Referring now to Figs. 6 and 8 there is provided on the end of shaft 108 a drive sprocket 174. Above the sprocket 174 is an idler sprocket 175 that is mounted on a stub shaft 176 that is journalled in a bearing plate 177. This bearing plate 177 is secured to the upper angle member 72 of the frame 65. It is to be noted that though the stub shaft 176 is disposed in alignment with the shaft 90 it is independent thereof with the idler sprocket 175 and may rotate entirely independent of the shaft 90. A sprocket chain 178 is adapted to operate over the drive sprocket 174 and the idler sprocket 175 and this sprocket chain 178 passes over a motor driven sprocket (not shown) that may be disposed below the slitter and separator machine. A lower idler sprocket 179 is journalled in an adjustable bearing plate 180 that is slotted as at 181 and thereby adjustably supported for horizontal movement on pins 182. The sprocket chain 178 passes over the idler sprocket 179 and tension in the sprocket chain 178 can be adjusted by adjusting the position of the adjustable bearing plate 180 and hence the position of the idler sprocket 179.

Thus it is seen that V-belts 136a and 136b are powered by rotation of the shaft 108 and moved in a direction so that the upper conveying portions of the belts move from the cutting drum 107 to their distant drums 157 or 138 as the case may be, while the lower portions of the guide belts 166a and 166b move in the same directions so that the adjacent portions of the belts 136a and 166a or 136b and 166b are adapted to move in the same direction. Since the guide belts 166a and 166b are powered by the shaft 90 they are in motion at all times when the slitter discs 106 are operating. The V-belts 136a and 136b however are powered from the sprocket chain 178 operating about the drive sprocket 174 and consequently V-belts 136a and 136b are driven independently of the slitter discs 106 and may be stopped in their operation while the slitter discs 106 are allowed to continue operating.

At the discharge end of the slitter and separator unit 63 are lower and upper conveyor units generally indicated at 183a and 183b respectively. Each of these conveyor units 183a and 183b comprises a plurality of rollers 184 that are disposed in parallel spaced relationship as best shown in Figs. 6, 7 and 12. These rollers 184 are journalled in spaced bearing plates 185 that are supported on the upright supporting plates 137. Each of the rollers 184 is provided with a drive sprocket 186 that is disposed adjacent to one end of the roller, and as shown the sprockets for the first, third, fifth and seventh rollers 184 are mounted adjacent to one side of the machine, whereas the sprockets for the second, fourth and sixth rollers are mounted adjacent to the opposite side of the machine. A drive sprocket 187 is mounted on each end of a shaft 187a that is journalled in the spaced upright supporting members 137 at a position below the corresponding bearing plate 185. A sprocket chain 188 is adapted to operate about each drive sprocket 187 and passes over the corresponding sprocket wheels 186 carried by the rollers 184. Thus all of the rollers 184 are powered through the drive sprocket wheels 187 and each of the drive sprocket wheels 187 is driven by a sprocket chain 189 that operates about a sprocket wheel 190 mounted on the shaft 187a of the drive sprocket wheels 187. The drive chain 189 is motor driven as will be brought out hereinafter.

Thus there is provided a slitter and separator machine that is adapted to receive an endless sheet of candy from the belt conveyor 47 and slit this sheet into strips of candy that corresponds in width with the width of candy bars. This machine then separates these endless strips alternately into ribbons or strips that are conveyed to lower and upper elevations by means of declined and inclined V-belts 136a and 136b so that when these strips reach the conveyor units 183a and 183b they are disposed with the adjacent ribbons at each level spaced apart at a distance corresponding to the width of one ribbon or strip of candy. These endless ribbons are then conveyed by the conveyor units 183a and 184b to the slicer 54 (Fig. 3) that is disposed at station D.

If during the operation of the slitter and separator, it is desired at any time to halt movement of the candy through the machine, the V-belts 136a and 136b may be stopped by ceasing the operation of the drive through the sprocket chain 178. If the sheet of candy however is in contact with the slitter discs 106 during the period when the advancement of the candy through the machine is halted, it is desirable that the slitter discs 106 continue to rotate in order to prevent sticking of the candy to the discs. This is readily accomplished because the drive for the slitter discs 106 is entirely independent of the drive for the V-belts 136a and 136b.

From the upper and lower bar conveyor units 183a and 183b respectively the ribbons or strips of candy are introduced into the bar slicer that is indicated at station D in Figs. 2, 3 and 4.

Figure 15:
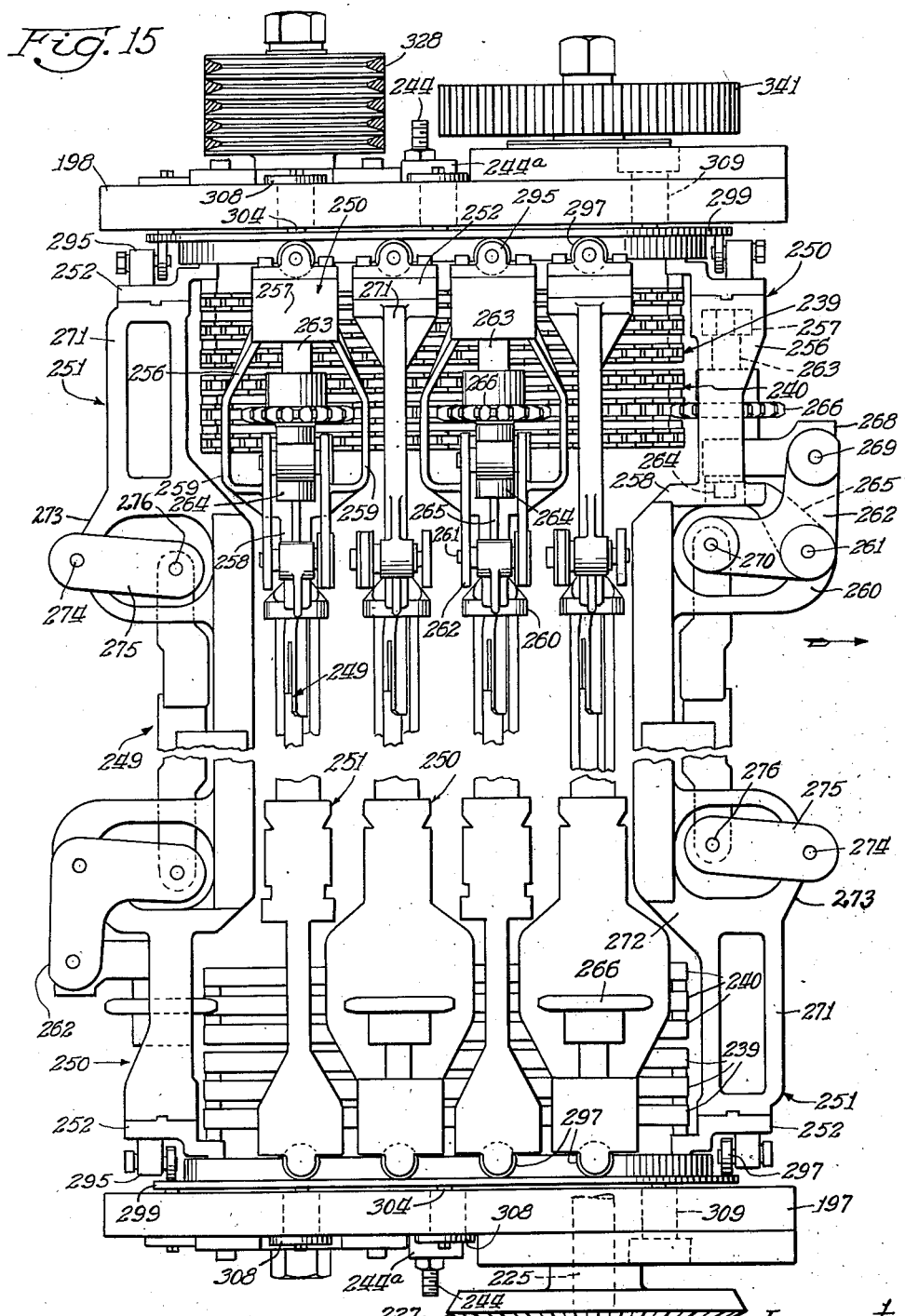
Fig. 15 is an enlarged fragmentary plan view of the slicer, the view being taken in the direction of the arrows 15—15 of Fig. 17.

Referring now to Fig. 14 a slicing machine referred to as a slicer 54 comprises generally a frame 195 that includes a base generally indicated at 196 on which are supported spaced side frame members 197 and 198 (see Fig. 15).

Mounted on the base 196 of the slicer as best shown in Fig. 14 is a speed reducer 199 that is motor driven through a chain drive 200 by motor 201. A drive shaft 202 extends upwardly from the speed reducer 199 and is driven by suitable gearing in the speed reducer.

As best shown in Figs. 14 and 15, mounted on the side frame member 197 of the slicer adjacent to the upper end of the shaft 202 (Fig. 14) is a drive chain housing 203. Mounted directly above the housing 203 is a gear housing 204 that is supported on the side frame 197 and spaced above this gear housing 204 is an upper gear housing 205 that is suitably secured to the side frame member 197 adjacent to the top of the slicer.

A vertical shaft 206 extends from a position adjacent to the lower end of the drive chain housing 203, projects upwardly through housing 204, and through the lower wall of the gear housing 205 to a position inside the gear housing 205. A lower bearing 207 (see Fig. 14) is mounted in the drive chain housing 203 to support the lower end of the shaft 206. Additional bearings are provided for the shaft 206 as indicated at 208, 209 and 210.

Mounted on the upper end of the vertical shaft 202 (Fig. 14) is a sprocket wheel unit 211 about which a drive chain 212 operates. This chain 212 is adapted to convey the driving power from the shaft 202 to the vertical shaft 206 through a second sprocket wheel unit 213 that is mounted adjacent to the lower end of shaft 206. Thus the motor 201 driving through the speed reducer 199 powers the vertical shaft 206. A bevelled gear 214 is mounted on the shaft 206 in the gear housing 204. Similarly a bevelled gear 215 is mounted at the upper end of the shaft 206 in the gear housing 205.

A plurality of horizontal braces 216, 217, 218 (Fig. 17) and 219 (Fig. 19) are disposed throughout the height of the frame 195 and are secured to the side frame members 197 and 198 so as to form a rigid structure.

Figure 16:
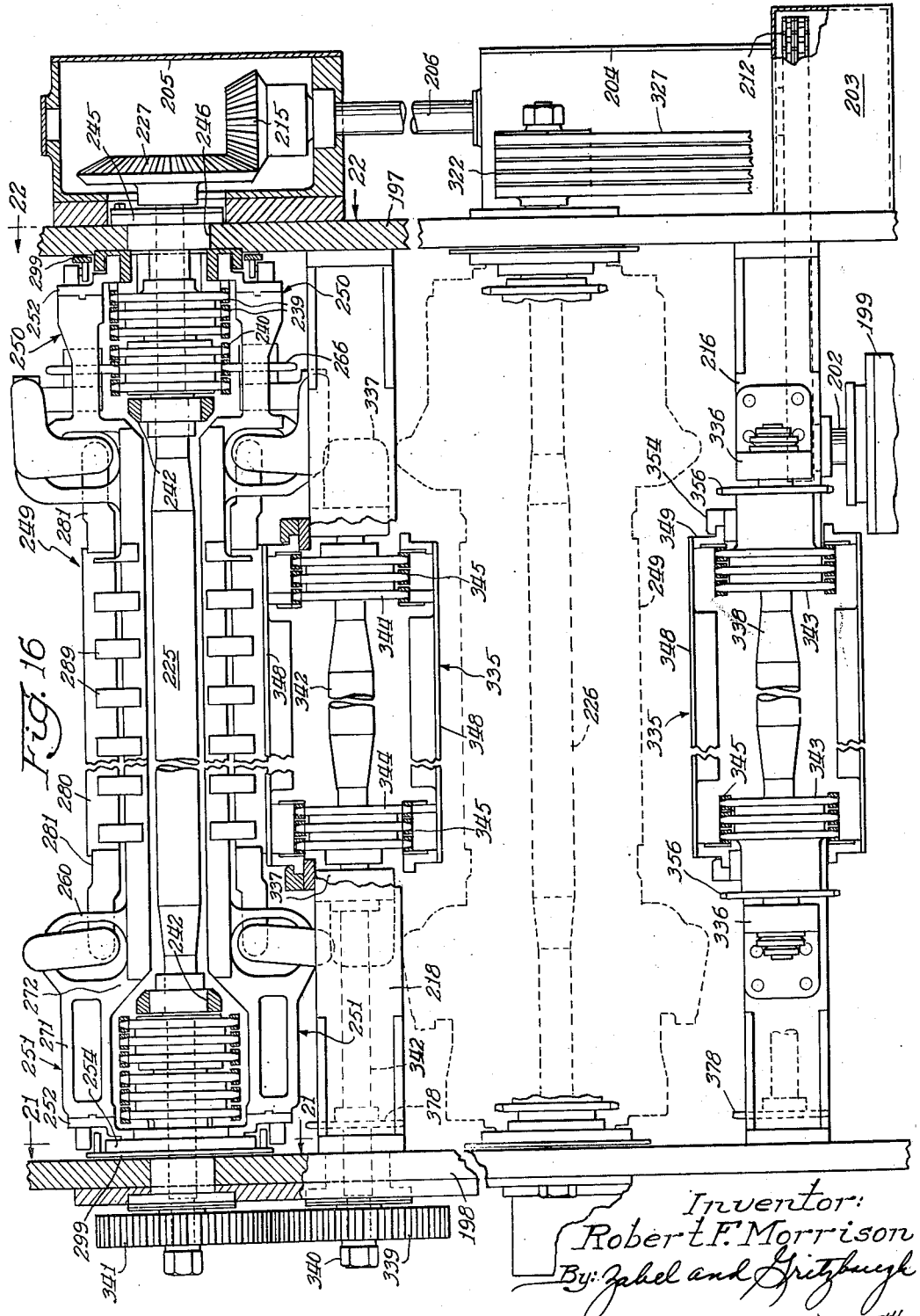
Fig. 16 is a vertical sectional view through the slicer, the view being taken on the line 16—16 of Fig. 17.
Figure 17:
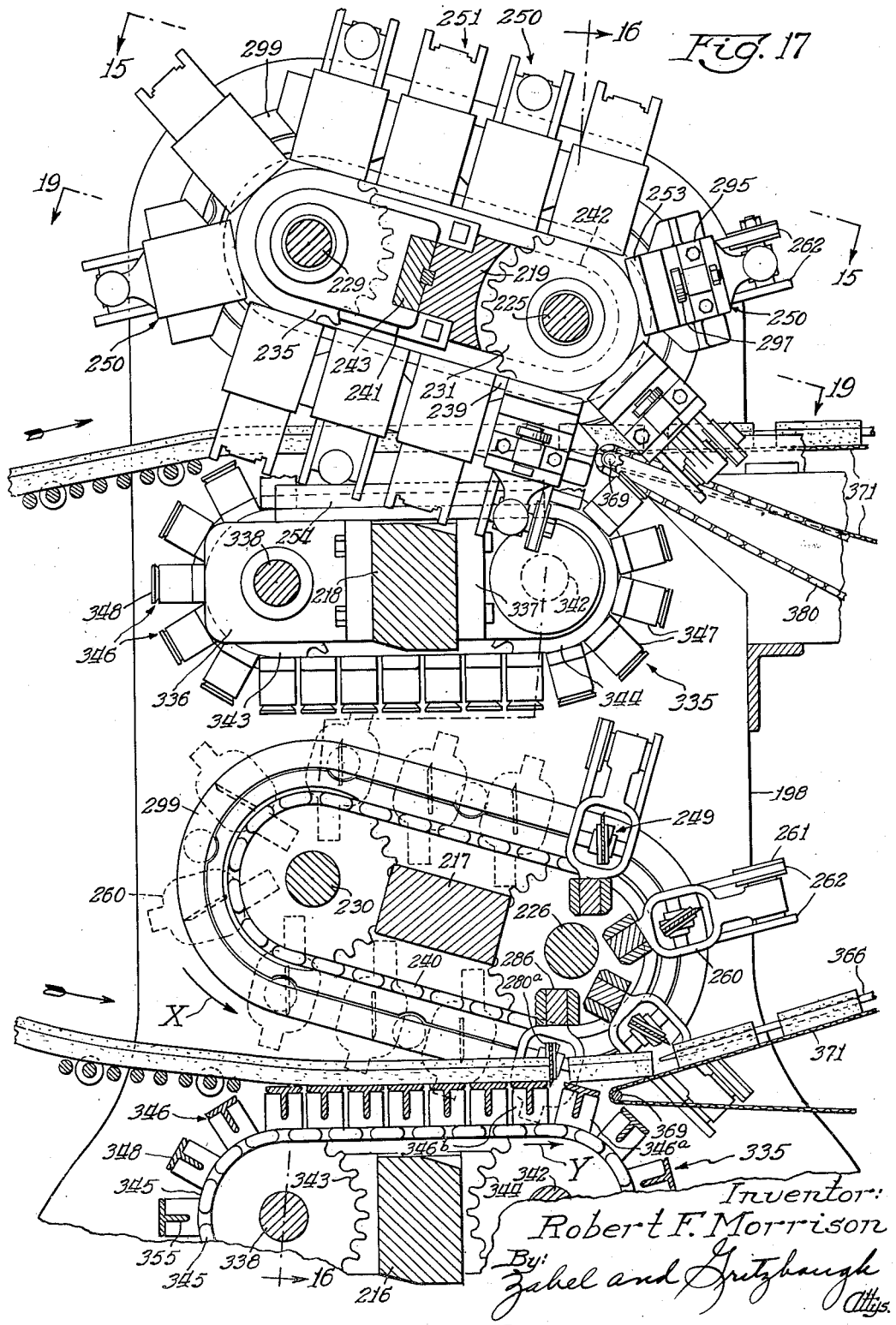
Fig. 17 is a longitudinal vertical sectional view taken through the slicer, the lower portion of the slicer being broken away.

As best shown in Figs. 14, 16 and 17 upper and lower horizontal shafts 225 and 226 respectively are suitably journalled in the spaced side frame members 197 and 198 and are disposed substantially in vertical alignment with each other. The horizontal shafts 225 and 226 project through the side frame member 197 into the upper and lower gear housings 205 and 204 respectively. Mounted on the end of the upper shaft 225 is a bevelled gear 227 which as shown in Figs. 14 and 16 is adapted to mesh with the bevelled gear 215 that is mounted on the upper end of the vertical shaft 206. Similarly a bevelled gear 228 (Fig. 14) is mounted on the end of the lower horizontal shaft 226 and is adapted to mesh with the bevelled gear 214 that is mounted adjacent to the lower end of the vertical shaft in the gear housing 204. Thus the upper and lower horizontal shafts 225 and 226 are powered from the vertical shaft 206 through the upper and lower sets of bevelled gears in the upper and lower gear housings 205 and 204 respectively.

Disposed to one side and above the upper and horizontal shaft 225 is a second upper horizontal shaft 229 that is suitably journalled in the spaced side frame members 197 and 198. Similarly, a second lower horizontal shaft 230 is disposed to one side and somewhat above the lower horizontal shaft 226; and this shaft 230 is likewise suitably journalled in the spaced side frame members 197 and 198. Mounted on the shaft 225 adjacent to each end thereof is a pair of sprocket wheels 231 and 232; each of the sprocket wheels 231 being keyed to the shaft 225 as indicated at 233 in Fig. 19. Each of the sprocket wheels 232 is free to rotate independent of the shaft 225, there being provided ball bearing mounting units 234 between the sprocket wheel 232 and the shaft 225. Thus each of the sprocket wheels 231 is fixed to rotate with the shaft 225 whereas each of the sprocket wheels 232 is independent of the rotation of the shaft 225.

Figure 19:
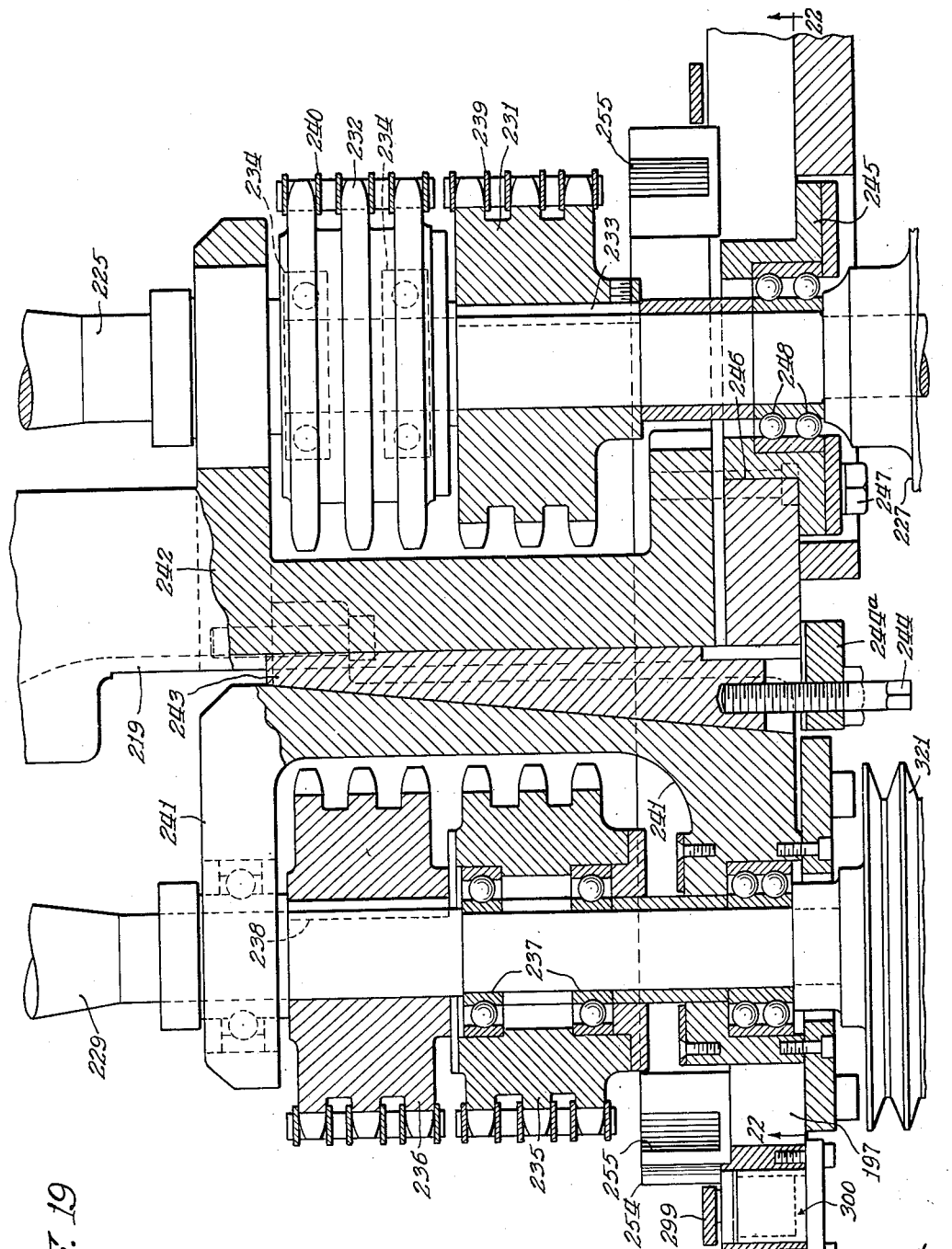
Fig. 19 is an enlarged sectional view through the slicer taken along the line 19—19 of Fig. 17.

Still referring to Fig. 19 the upper horizontal shaft 229 is similarly provided at each end thereof with a pair of sprocket wheels 235 and 236, each sprocket wheel 235 being in alignment with the fixed sprocket wheel 231 on the shaft 225; and the sprocket wheel 236 being in alignment with the freely mounted sprocket wheel 232 on the shaft 225. The sprocket wheel 235 is freely mounted on the shaft 229 by ball bearings 237 whereas the sprocket wheel 236 is fixed to the shaft 229 by key and keyway members indicated at 238. Thus the sprocket wheel 235 is free to rotate independent of the shaft 229, whereas the sprocket wheel 236 is fixed to the shaft 229 and, therefore, rotates only with this shaft. A sprocket chain unit 239 that may be made up of a plurality of sprocket chains is mounted on the pair of sprocket wheels 231 and 235 and a second sprocket chain unit 240 is mounted on the pair of sprocket wheels 232 and 236. Such sprocket chain units 239 and 240 are provided at each end of the shafts 225 and 229. Thus there is provided a suitably driven sprocket chain unit 239 that receives its power from the horizontal shaft 225 and is caused to operate between the driving sprocket wheel 231 and the idler sprocket wheel 235.

The lower horizontal shaft 226 is identical with the upper horizontal shaft 225 and serves the same purpose. Similarly the lower horizontal shaft 230 is identical with the upper horizontal shaft 229 and serves the same purpose. Lower shafts 226 and 230 cooperate with each other and are provided with sets of driving sprocket wheels and idler sprocket wheels of the type just described, with respect to the upper horizontal shafts 225 and 229. Thus a complete detailed description of the upper pair of shafts 225 and 229 with their drives functioning together with the slicer knives and knife assemblies will be presented herein with the understanding that there is a second identical assembly of knives and knife assemblies associated with the lower shafts 226 and 230.

As previously mentioned the horizontal shaft 225 is suitably journalled in the spaced side frame members 197 and 198. One of the mountings is shown in Fig. 19 where a bushing 245 is mounted concentrically about the end of the shaft 225 and is supported in an aperture 246 in the side frame member 197. This bushing 245 is fixed with respect to the side frame member 197 after it is once bolted in place as indicated at 247. A ball bearing unit 248 is inserted between the shaft 225 and the housing 245.

The shaft 229 is journalled in the walls 197 and 198 in a manner so that the distance between shafts 225 and 229 can be adjusted so as to take up the slack in the sprocket chain units 239 and 240, if such is needed. This is accomplished by mounting shaft 229 in bearing blocks 241 (one at each end of the shaft) and shaft 225 in bearing blocks 242 between each pair of which is disposed a wedge member 243. The blocks 241 can move laterally with respect to the shaft 225 so that by adjusting the position of wedge member 243, the spacing of the shafts 225 and 229 can be adjusted. Adjusting bolts 244 passing through plate 244a fix the position of each wedge block 243. Thus tension in each sprocket chain 239 and 240 can be adjusted.

Figure 20:
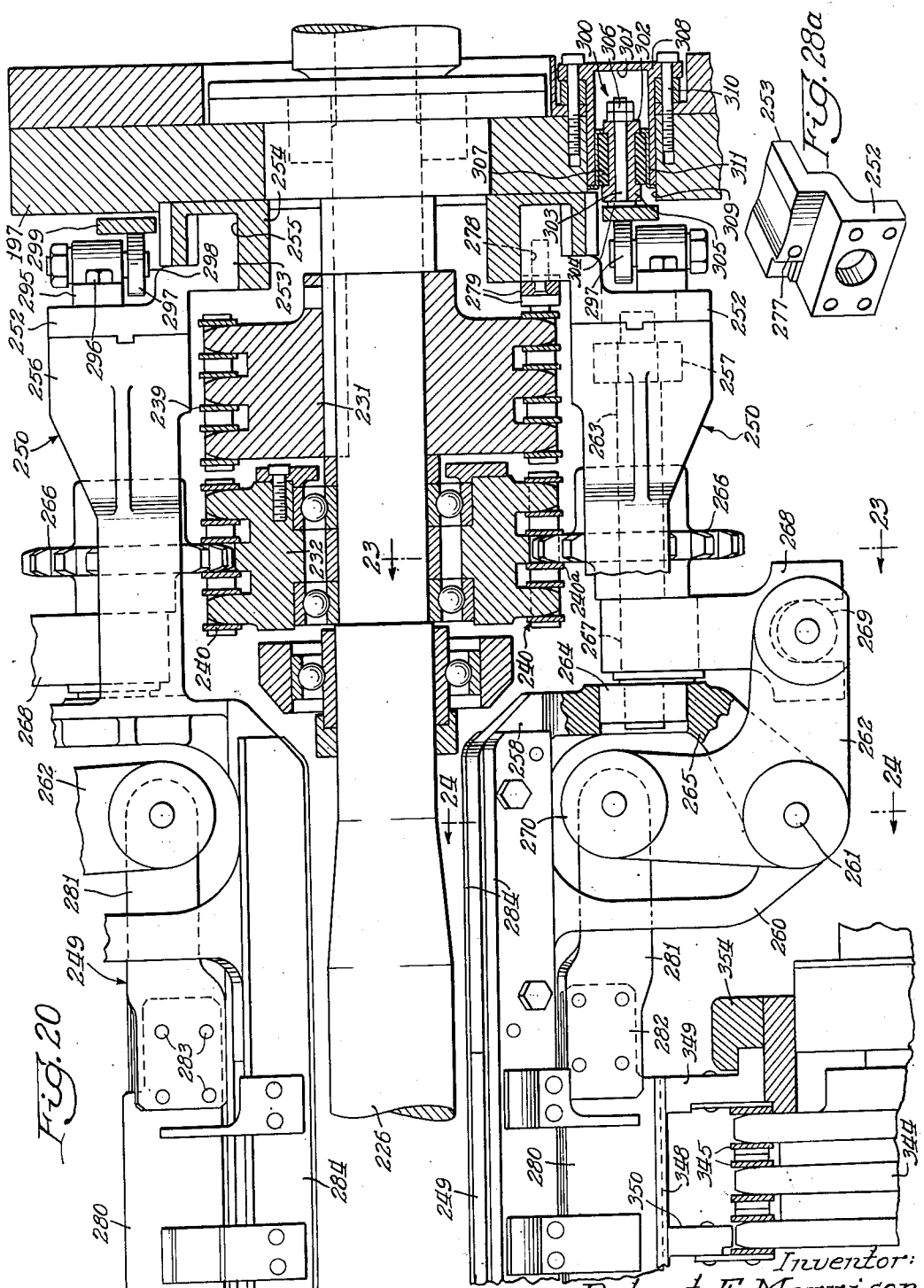
Fig. 20 is an enlarged vertical sectional view taken along the line 20—20 of Fig. 14.

Each of the sprocket chain units 239 is adapted to drive a plurality of slicer knife assemblies generally indicated at 249 in Figs. 15, 16 and 20. As best shown in Fig. 17 there are twelve of these knife assemblies 249 that are disposed about the length of the sprocket chain unit 239 and as this sprocket chain unit 239 moves in an endless fashion about the sprocket wheels mounted on shafts 225 and 229 it is proposed that the sprocket chain unit 239 pull these slicer knife assemblies 249 with it.

Referring now to Figs. 15, 16 and 20 each of the knife assemblies 249 is mounted between knife carrier units 250 and 251 that are spaced at opposite ends of each knife assembly 249. Each knife carrier unit 250 and 251 is mounted on a backing member 252 (Figs. 16 and 20) that is provided with a rearwardly extending follower portion 253. Mounted on the inner face of each of the side frame members 197 and 198 is a track plate member 254 that is provided with a track 255 in which all of the followers 253 of the backing members 252 operate. This track 255 conforms in shape with the path of the sprocket chain unit 239 so that as the sprocket chain unit 239 conveys the slicer knife assemblies 249 through their operating paths the knives are properly guided by cooperation between the followers 253 and the track 255.

Each of the knife carrier units 250 comprises a carrier housing frame 256 which at one end is provided with a journalled bearing portion 257 and at the opposite end is provided with a knife attaching projection 258. A pair of spaced wall portions 259 are disposed between the bearing portion 257 and the knife attaching projection 258. Extending upwardly from the knife attaching projection 258 is a fulcrum arm 260 that provides a fulcrum or bearing 261 for a bell crank 262. A rotatable shaft 263 is supported in the knife carrier housing 256 and is journalled at one end in the bearing portion 257 of the knife carrier housing 256 and at the opposite end is journalled in a bearing 264. A brace 265 is provided between the fulcrum member 261 and the bearing member 264 so as to provide sufficient strength for the fulcrum member 261.

Mounted on the shaft 263 is a sprocket wheel 266 that is fixed to the shaft. The shaft 263 is provided with an eccentric sleeve indicated at 267 upon which is mounted a connecting arm 268 that is pivotally secured at 269 to one arm of the bell crank 262. The fulcrum arm 260 as illustrated in Figs. 15 and 20 is bifurcated so as to allow one end of the knife assemblies 249 to pass between the arms thereof. Each end of each knife assembly 249 is pivotally attached to the free end of a corresponding bell crank 262 as at 270.

Each of the knife carrier units 251 comprises one of the backing members 252 and a connecting bracket 271 that is secured at one end to the backing member 252 (see Figs. 15 and 16). Each connecting bracket 271 is provided at its free end with a knife attaching projection 272 that corresponds with the similar attaching projection 258 on the opposite knife carrier housing 256. Extending oppositely from the knife attaching projection 272 is a fulcrum arm 273 (Fig. 15) that supports a bearing or fulcrum 274 on which is pivotally mounted a link 275. The free end of the knife assembly 249 is pivotally attached to the free end of the link 275 at 276.

Each of the backing members 252 on the carrier housings 256 and the connecting brackets 271 is secured to the corresponding sprocket chain unit 239 by means best illustrated in Figs. 20 and 28a. This is accomplished by providing an aperture 277 in each of the backing members 252 as illustrated in Fig. 28a and providing a pin that is fixed with respect to one link in the sprocket chain unit 239 to project into its aperture 277. This pin is illustrated at 278 in Fig. 20 and suitable spacers 279 are provided between the link of the sprocket chain unit 239 and the backing member 252.

A roller supporting member 295 is suitably bolted as at 296 onto each backing member 252. A guide roller 297 is rotatably mounted on a shaft 298 that is supported by the roller supporting member 295. An annular track 299 is mounted concentrically about the track plate member 254 and the rollers 297 are adapted to engage this plate.

The annular track member 299 is backed by a plurality of cushioning units 300 that are carried in pockets 301 in the side frame member 197 (or 198 as the case may be). This cushioning member 300 comprises a movable cushion core 302 made up of a central shaft 303 that is provided with a track engaging head or backing member 304. A sleeve 305 surrounds the shaft 303 and is firmly held in place by nuts 306 threaded onto the end of the shaft 303. The sleeve 305 is annularly grooved to receive a rubber or the like ring 307 that is mounted about the periphery of the sleeve 305. The pocket 301 is formed in a housing member 308 that is adapted to fit into an aperture 309 in the side frame 197 and is bolted in place as at 310. The rubber ring 307 is secured to the housing 308 by means of attaching brackets 311. Thus the cushion core 302 has relative in and out movement in the pocket 301 by virtue of the resilient connection between this core and the housing 308 through the rubber ring 307. In this manner the annular track 299 is resiliently backed.

Each of the knife assemblies 249 comprises a knife blade 280 that is secured at its opposite ends to attaching arms 281. Each of these attaching arms 281 is bifurcated as at 282 to receive the blade between the arms thereof and the blade is screwed or riveted to the bifurcated portion 282 as at 283. The free end of one of these attaching arms 281 is pivotally secured to the bell crank 262, and the free end of the other attaching arm 281 is pivotally secured to the link 275 that is disposed at the other side of the machine.

As best shown in Figs. 25, 26 and 27 a pair of spaced connecting plates 284 extends between the spaced knife attaching projections 258 and 272 opposite the knife carrier units 250 and 251 and these connecting plates 284 are secured to the projecting portions 258 and 272 by means of screws 285. A filler plate 286 is disposed between the spaced plates 284 and extends between the ends of the knife attaching projections 258 and 272 on the carrier housing 256 and connecting bracket 271, and the spaced plate 284 and filler plate 286 are secured together by suitable screws 287 (Fig. 25).

As best shown in Figs. 25 and 27 a plurality of oppositely disposed guide blocks 288 and 289 are attached to the spaced plates 284 and each of the guide blocks 288 and 289 is provided with upper and lower inwardly projecting guide posts 290. The knife blade 280 is disposed between the free ends or heads of the guide posts 290. The spacing between the adjacent heads can be varied by manipulation of nuts 291 that are threaded onto each of the guide posts 290. Thus there has been described a complete knife assembly 249 that is pivotally mounted on its opposite ends on a bell crank 262 and a link 275 and is guided between a plurality of guide posts 290 that maintain the knife blade 280 in straight alignment during its operation.

As best shown in Fig. 20 the sprocket wheel 266 is adapted to engage one sprocket chain 240a in the sprocket chain unit 240 so that when the sprocket chain unit 240 is placed into motion in a manner hereinafter described the sprocket wheel 266 is powered to drive shaft 263. This causes the shaft 263 to rotate, thereby providing reciprocating motion to the connecting arm 268 that is mounted on the eccentric sleeve 267, thereby pivoting the bell crank 262 about its fulcrum 261. This pivoting of the bell crank 262 provides reciprocating motion to the slicer knife assembly 249, the other end of the assembly causing the link 275 to pivot about its fulcrum axis 274.

As previously mentioned the sprocket chain unit 240 (see Fig. 19) operates about the driving sprocket wheel 236 and the driven or idler sprocket wheel 232. This sprocket wheel 236 is keyed to the shaft 229 as previously mentioned so that when the shaft 229 is rotated the sprocket chain unit 240 is driven through the sprocket wheel 236.

Mounted on the end of the shaft 229 is a pulley wheel 321 (see Figs. 14 and 19). Similarly, the lower horizontal shaft 230 is provided with a pulley wheel 322, the pulley wheels 321 and 322 being disposed at opposite sides of the device so that one is disposed adjacent to the side frame member 197, whereas the other is disposed adjacent to the side frame member 198.

Figure 21:
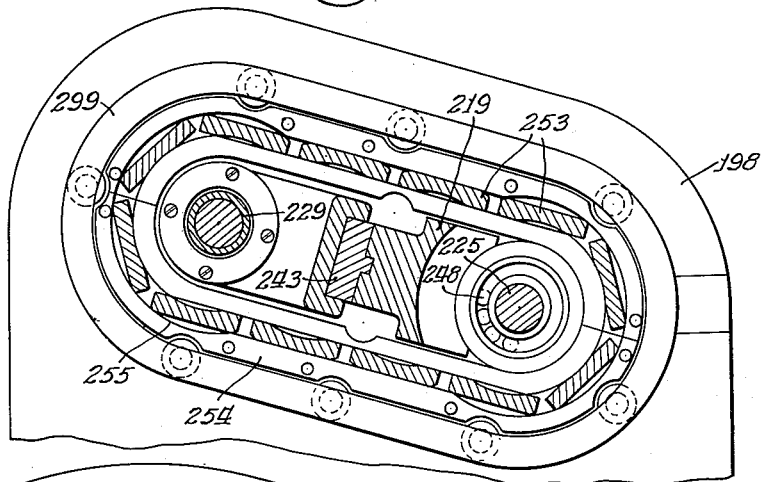
Fig. 21 is an enlarged vertical sectional view taken along the line 21—21 of Fig. 16.
Figure 22:
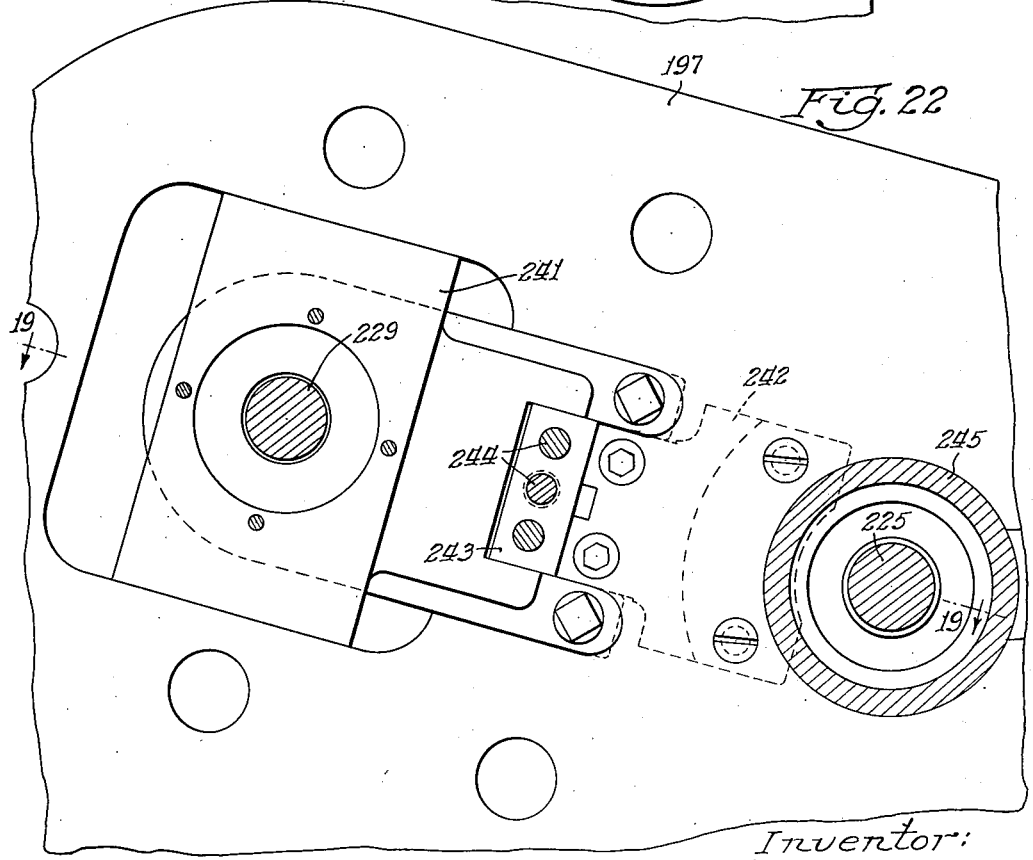
Fig. 22 is an enlarged fragmentary vertical sectional view taken along the line 22—22 of Figs. 16 and 19.
Figure 33:
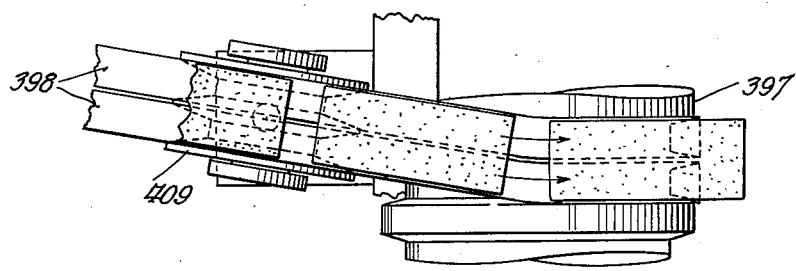
Fig. 33 is an enlarged detail view taken at the right hand end of the device shown in Fig. 29 and illustrating the transfer of a candy bar from the bar spacer onto the final conveyor that conveys the bars to the chocolate enrober.
Figure 32:
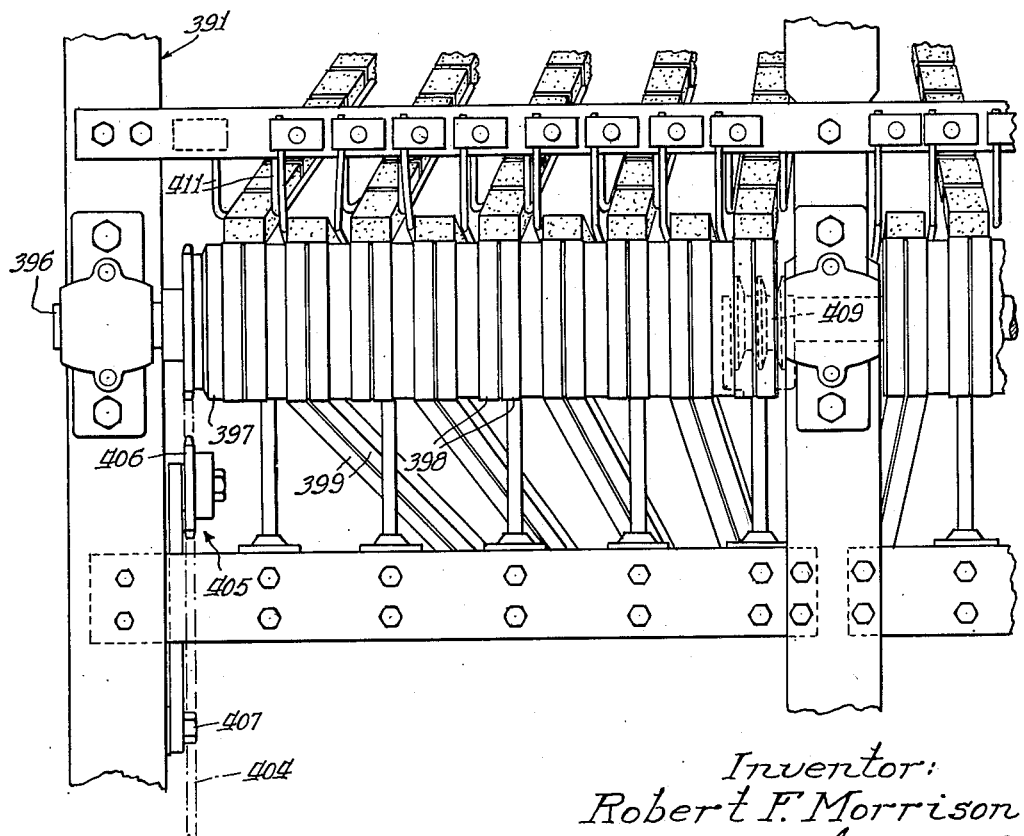
Fig. 32 is an enlarged fragmentary end elevational view, the view being taken in the direction of the arrows 32—32 of Fig. 30.

As shown in Fig. 14 a motor 323 is mounted on a base plate 324 that is suitably attached to the base 196 of the device. This motor 323 is provided with a pulley 325 on the end of its shaft 326 and a belt 327 operates about the motor shaft pulley 325 and the pulley 322 that is disposed on the end of the lower horizontal shaft 230. A similar motor (not shown) is provided on the other side of the device and a belt indicated at 328 in Fig. 14 is driven by such second motor so as to power the upper shaft 229, the belt 328 operating the forward upper pulley 321. Thus there is provided a motor drive for the upper and lower shafts 229 and 230 that are independent of each other and these two motor drives are independent of the motor drives to the shafts 225 and 226. Shafts 225 and 226 when power driven operate their corresponding sprocket chain units 239, whereas shafts 229 and 230 when power driven operate their sprocket chain units 240. When each sprocket chain unit 239 is placed into operation it moves the knife carrier units 250 and 251 around the more or less oval shape track 255 (see Figs. 17 and 21). When the shaft 229 or 230 is rotated by its respective drive it places into motion the corresponding sprocket chain units 240. Movement of each set of sprocket chain units 240 conveys rotary motion through each of the sprocket wheels 266 (see Figs. 15 and 20) so as to reciprocate the knife units 249 in the manner previously described. In practice the movement of the sprocket chain unit 240 is very much faster than that of the sprocket chain unit 239 so as to provide relatively high speed reciprocating motion to the knife unit assembly 249 while the knife carrier units 250 and 251 are moved at a relatively slow rate.

Now referring to Figs. 16 and 17 there is mounted below the upper pair of horizontal shafts 225 and 229 a candy supporting unit generally indicated at 335. Similarly there is provided such a unit below the lower pair of horizontal shafts 226 and 230. The upper candy conveying unit 335 is supported on the cross tie 218 of the machine frame, whereas the lower conveying unit is supported on the cross tie 216 of the frame. In both instances, however, the candy supporting units are identical and, therefore, one only will be described herein.

Referring now to Figs. 16 and 17 there is mounted adjacent to each end of the cross tie 218 a pair of angle brackets 336 and 337, one being mounted on one single face of the cross tie 218 and the other being mounted on the opposite face of the cross tie. Thus there are two spaced angle brackets 336 at opposite ends of the cross tie 218 secured to one face of the cross tie and two spaced angle brackets 337 at opposite ends of the cross tie 218 but fastened to the other face of the cross tie 218. Mounted in the pair of spaced angle brackets 337 is a rotatable shaft 342 that commences at one end of the bracket 337 as shown in Fig. 16 and projects through the opposite angle bracket 337 and through the side frame 198. A gear 339 is mounted on the end of the shaft 342 adjacent to the outside of the side frame 198 and is held in place by a suitable nut 340. A meshing gear 341 is mounted on the end of shaft 225 so that as the shaft 225 is rotated in a manner previously described, this rotation is transmitted to the shaft 342 through the gear trains 341 and 339.

Mounted in the spaced angle brackets 336 is a shaft 338 that is journalled at both ends in the bracket members 336. It is to be noted that as shown in Fig. 17 in each pair of shafts 338 and 342 the shaft 338 is on the left side of the cross tie 218 and the shaft 342 is disposed on the right side of this cross tie.

Again referring to Figs. 16 and 17 a sprocket wheel 343 is mounted adjacent to each end of the shaft 338 and similarly a sprocket wheel 344 is mounted on each end of the shaft 342. A sprocket chain unit 345 operates about each pair of sprocket wheels 343 and 344. The candy conveying unit 335 on each level is driven by shaft 338 by means of the sprocket chain 189 operating between sprocket wheels 356 and 190 on shaft 338 of the slicer and 187a of the bar conveying unit (Fig. 6) respectively.

As best shown in Figs. 16, 17, 25 and 28 there are mounted on the sprocket chain units 345 a plurality of candy supporting bearing assemblies 346, each of which comprises spaced supporting leg members generally indicated at 347 in Fig. 17 and upon each pair of supporting leg members is mounted a plate 348. Each supporting leg member 347 comprises legs 349 and 350 that are fixed to the opposite faces of the corresponding sprocket chain unit 345 by means of attaching plates 351 and the plate member 348 is suitably fastened to the spaced pair of legs 349 and 350. Each of the legs 349 is provided with an outwardly extending follower projection 352 that is adapted to ride in a substantially oval shape track 353 that is provided in a track member 354. This track 353 conforms in shape with the path of the sprocket chain unit 345. The plate member 348 as best shown in Fig. 17 is more or less T-shape in cross section throughout the distance between the adjacent legs 350 (see Fig. 25), the downwardly projecting portion of the T-section being indicated at 355.

Thus there is provided a candy supporting member 335 that is made up of a plurality of supporting plates 348 that are conveyed by sprocket chain units 345 disposed at opposite ends thereof. As best shown in Fig. 17 each of these candy supporting units 335 is disposed directly below the knife assemblies 249. As shown in the lower portion of Fig. 17 as the knife blades 280 are carried by the sprocket chain units 239 they are moving in a direction from left to right as indicated by the arrow X so that as these knife blades 280 approach the candy supporting unit 335 they move from a position considerably above the upper portion of the candy supporting unit to a position between adjacent plate members 346 as best illustrated by the blade 280a. In this lower portion of Fig. 17 the sprocket chain 345 is moving in the direction of the arrow Y so that when the knife blade 280a is disposed in the position shown in the drawings the supporting blade 346a has moved from the horizontal position to the break-away position where it passes downwardly around the sprocket wheel 343, whereas the supporting plate disposed just to the rear of the slicer knife 280a indicated at 346b is still disposed in the horizontal position and the blade 280a passes along the forward edge of this supporting plate 346b and actually is disposed below the upper surface of this last mentioned supporting plate.

Figure 18:
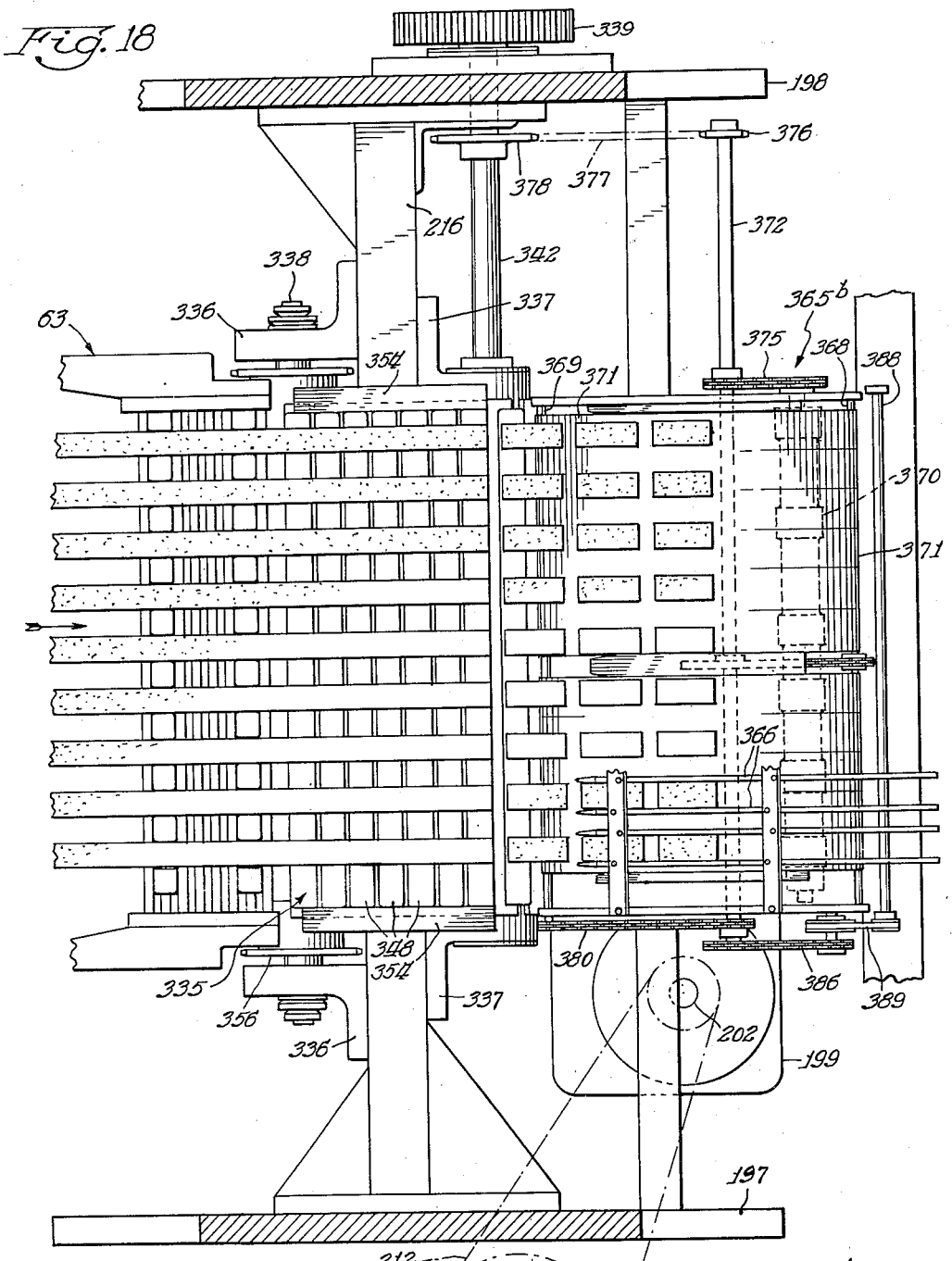
Fig. 18 is a fragmentary horizontal sectional view through the slicer, the view being taken on the line 18—18 of Fig. 14.

The upper and lower bar transfer units are indicated in Figs. 14 and 18 at 365a and 365b respectively. The upper bar transfer unit 365a receives candy bars from the upper slicing level of the slicer 54 and conveys them to an upper level 57a of the bar spacer generally indicated at 57 in Fig. 14.

Referring to Figs. 14 and 17 the lower bar transfer unit 365b receives candy bars from the lower slicing level of the slicer 54 and conveys them to the lower level 57b of the bar spacer generally indicated at 57. The upper bar transfer unit 365a comprises generally a framework 367 on which is journalled a pair of spaced upper rollers 368 and 369. A drum 370 is likewise journalled in the frame 367 and is disposed at a level below rollers 368 and 369. A screen-like conveyor member 371 is mounted about the rollers 368 and 369 and the drum 370 so as to form an endless conveyor. A shaft 372 is mounted in the frame 367 adjacent to the drum 370 and mounted on each end of this shaft 372 is a sprocket wheel 373. The drum 370 is likewise provided with a sprocket wheel 374 on each of its ends and a sprocket chain 375 operates about each pair of sprocket wheels 373 and 374. The shaft 372 is further provided with a drive sprocket 376 adjacent to one of its ends about which a drive chain 377 operates. The chain 377 operates over a sprocket wheel 378 that is provided adjacent to the end of the shaft 342. Thus the shaft 372 is powered from the shaft 342 of the slicer through the drive chain 377. Each end of the roller 369 on the upper bar transfer unit 365a is provided with a sprocket wheel 379 about which a chain 380 operates. Each chain 380 is powered from a sprocket drive on the shaft 372. Likewise the roller 368 is provided with a suitable sprocket drive adjacent each end thereof to receive a chain 381 that is powered from a suitable sprocket wheel 382 mounted on the shaft 372. Thus rollers 368 and 369 and the drum 370 are all powered from the shaft 372.

Mounted below the shaft 372 is a sub-frame 383 on which is journalled a shaft 384. This shaft 384 is provided with suitable sprocket wheels 385 about which a sprocket chain 386 operates, this chain receiving its power from a sprocket wheel 387 mounted on the shaft 372. A roller 388 is suitably journalled in spaced relationship to the roller 368 and is powered by a drive belt or chain 389 that operates about a pulley or sprocket 390 on the shaft 384.

The lower bar transfer unit 365b is the same as the upper unit 365a except that the upper conveying surface is disposed in an upwardly inclined direction, whereas the conveying surface of the upper transfer unit 365a is substantially horizontal. It is recognized, of course, that this lower unit can likewise have a horizontal conveying surface or the inclination can be adjusted to fit the particular needs. In the instant case the lower bar spacer unit 57b is disposed somewhat above the level of the lower slicing facilities in the slicer 54 and for this reason the lower bar transfer unit 365b is shown inclined upwardly so as to bring the bars to the level of the lower bar spacer unit 57b.

Thus there is provided a bar transfer unit that has a roller 369 adapted to fit closely adjacent to the exit end of the slicer 54 as best shown in Figs. 14 and 17. The candy bars leaving the slicer 54 are conveyed by the chain conveyor 371 toward the bar spacer generally indicated at 57 in Fig. 14. The rate of travel of the chain 371 is, of course, dependent upon the ratio as between the various sprocket drives. It is desirable in any event that this chain travel at a slightly greater speed than the conveyor units that move the candy through the slicer. This is done to be sure the cut bar is moved out of the way of the next succeeding bar so as to avoid interference of the candy passing through the slicer.

Suitable guide bars as indicated at 366 in Fig. 18 may be disposed in the regions between the path of the candy bars so as to prevent sidewise interference between the bars moving over the bar transfer unit 365a or 365b. The roller 388 disposed at the exit end of the upper or lower bar transfer unit 365a or 365b serves to convey the candy bars from the bar transfer unit onto the bar spacer level 57a or 57b as the case may be.

The bar spacer 57 is best shown in Figs. 29 to 33 inclusive. This device comprises a frame generally indicated at 391 on which are suitably journalled upper and lower shafts 392 and 393, respectively on which are mounted upper and lower drums 394 and 395, respectively. At the opposite end of the frame 391 is suitably journalled a shaft 396 on which is mounted a drum 397. A plurality of upper and lower conveyor belts 398 and 399 respectively are mounted on the drums, the upper conveyor belts 398 being mounted on drums 394 and 397 and the lower conveyor belts 399 being mounted on drums 395 and 397. As best shown in Fig. 29 these belts 398 and 399 are mounted in pairs and are V-belts adapted to operate in grooves in their respective rollers.

Referring to Fig. 29 it is to be noted that the frame 391 at the left hand end is relatively narrow and is wider at the right hand end so that the pairs of belts fan out from left to right.

Mounted adjacent to the lower end of the frame 391 is a shaft 400 that is journalled at the right hand end (in Fig. 30) of the frame 391. This shaft 400 is provided with a sprocket wheel 401 about which a sprocket chain 402 operates. This sprocket chain 402 is driven from the speed reducer 103 shown in Fig. 6. Thus the shaft 400 is driven from the speed reducer 103 that is disposed below the slitter and separator 63. The shaft 400 is likewise provided with a sprocket wheel 403 that is disposed adjacent each end thereof and a sprocket chain 404 operates about each sprocket wheel 403 and a cooperating sprocket wheel mounted on the shaft 396. Thus the shaft 396 is powered from shaft 400. A suitable take-up device indicated at 405 provided with an idler sprocket 406 is mounted on the frame 391 and is provided for each chain 404. This take-up device is pivoted at 407 and can be locked into position by a suitable bolt and nut (not shown) passing through slot 408.

A plurality of guide rollers 409 may be provided at various positions along the upper and lower belts 398 and 399 respectively.

As shown in Fig. 30 the bar spacer 57 is disposed with the rollers 394 and 395 closely adjacent to the exit end of the upper and lower bar transfer units 365a and 365b respectively. Candy bars moving in the direction indicated by the arrows 410 in Fig. 30 are supported across the gaps between the upper and lower bar transfer units 365a and 365b and the upper and lower bar spacer levels 57a, 57b. These bars are then conveyed by the bar spacer 57 to a common plane at the exit end of the bar spacer and are finally deposited on the one level conveyor 58. As can be seen from Figs. 29 and 30 the bar spacer 57 serves to bring the bars to a common level and at the same time spaces the bars in a lateral direction so that the bars on the single plane conveyor 58 are properly spaced from each other, both in sidewise and endwise directions for the chocolate enrobing operation. Suitable guide bars 411 (Figs. 29 and 30) are provided on the bar spacer 57 to guide the candy bars and prevent lateral displacement of the candy while it is being conveyed through the bar spacer.

There is thus provided a device for slitting, spreading, slicing and separating candy bars from the continuous sheet of candy in a manner that is entirely automatic and requires no touching of the candy by the human hand. The device thus described is efficient in its operation and is particularly well suited for mass production methods for producing candy bars.

I claim:

1. In combination, a plurality of slitting discs disposed in horizontal linear spaced relationship and adapted to rotate in parallel vertical planes, a slicer spaced from the discs in a direction lengthwise of said planes and provided with a plurality of slicing platforms one disposed above the other, slicer knife means above each platform, conveyor means extending from the slitting discs to each slicing platform, and conveyor means extending from each slicing platform at each cutting level to a common level.

2. In combination, a plurality of slitting discs disposed in horizontal linear spaced relationship and adapted to rotate in parallel vertical planes, a slicer spaced from the discs in a direction lengthwise of said planes and provided with a plurality of slicing platforms one disposed above the other, substantially horizontal conveyor means at each level of the slicer platforms adapted to travel to the slicer, slicer knife means adjacent to each platform disposed above the horizontal conveyor means, means on the slicer mounting each knife means for movement in the direction of movement of the horizontal conveyor means, conveyor means disposed from the slitting discs to each horizontal conveyor means, and conveyor means disposed from the slicing platform at each cutting level to a common level.

3. For use in cutting a sheet of candy into uniform bar sizes, the combination of a slitter and a slicer, the slitter comprising a plurality of slitting knives disposed in horizontal spaced relationship, means for conveying the sheet of candy into the slitting knives, separator conveyor means disposed between the slitter and the slicer comprising a plurality of upper conveyor belt-like members extending from the level of the slitting knives to an elevated position, a plurality of lower conveyor belt-like members extending from the level of the slitting knives to a lower position, the upper and lower belt-like members being disposed side by side in their common plane and the upper belt-like members alternating between the lower belt-like members, the slicer comprising an upper cutting platform adjacent to the upper end of the upper belt-like members and a lower cutting platform disposed adjacent to the lower end of the lower belt-like members, substantially horizontal conveying means extending to the upper and lower cutting platforms of the slicer from said upper and lower conveyor members, conveying means disposed between the discharge ends of the upper and lower horizontal conveying means and a common level spaced from the discharge end of the slicer, slicer knife means disposed above each of the slicing platforms, and means on the slicer connected in driving relationship with the slicer knife means for imparting to the slicer knives vertical movement and movement in the direction of travel of the horizontal conveying means.

4. In combination, a plurality of slitting discs disposed in horizontal linear relationship and adapted to rotate in parallel vertical planes, a slicer spaced from the discs in a direction lengthwise of said planes and provided with a plurality of slicing platforms one disposed above the other, slicer knife means above each platform, conveyor means extending from the slitting discs to each slicing platform, and bar spacer means disposed at the discharge end of each slicer knife means.

5. In combination, a plurality of slitting discs disposed in horizontal linear spaced relationship and adapted to rotate in parallel vertical planes, a slicer spaced from the discs in a direction lengthwise of said planes and provided with a plurality of slicing platforms one disposed above the other, slicer knife means above each platform, conveyor means extending from the slitting discs to positions adjacent each slicing platform, conveyor means passing to each platform of the slicer from said first mentioned conveyor means, conveyor means disposed adjacent to the discharge end of each slicer knife means, a bar transfer unit between each of the last named conveyor means and its associated slicer knife means, and means powering each bar transfer unit at a speed in excess of the conveyor means passing to the slicer platforms.

6. In combination, a plurality of slitting discs disposed in horizontal linear spaced relationship and adapted to rotate in parallel vertical planes, a slicer spaced from the discs in a direction lengthwise of said planes and provided with a plurality of slicing platforms one disposed above the other, slicer knife means above each platform, conveyor means extending from the slitting discs to positions adjacent each slicing platform, conveyor means passing to each platform of the slicer from said first mentioned conveyor means, and conveyor means disposed adjacent to the discharge end of each slicer knife means, said last named conveyor means providing a plurality of paths diverging away from the slicer knife means.

7. In combination, a plurality of slitting discs disposed in horizontal linear spaced relationship and adapted to rotate in parallel vertical planes, a slicer spaced from the discs in a direction lengthwise of said planes and provided with a plurality of slicing platforms one disposed above the other, slicer knife means above each platform, conveyor means extending from the slitting discs to positions adjacent each slicing platform, conveyor means passing to each platform of the slicer from said first mentioned conveyor means, conveyor means disposed adjacent to the discharge end of each slicer knife means, said last named conveyor means providing a plurality of paths diverging away from the slicer knife means, a bar transfer unit between the last named conveyor means and the slicer knife means, and means powering the bar transfer unit at a speed in excess of the conveyor means to the slicer.

8. In combination, a plurality of slitting discs disposed in horizontal linear spaced relationship and adapted to rotate in parallel vertical planes, a slicer spaced from the discs in a direction lengthwise of said planes and provided with a plurality of slicing platforms one disposed above the other, slicer knife means above each platform, conveyor means disposed from the slitting discs to positions adjacent each slicing platform, conveyor means passing to each platform from said first mentioned conveyor means, and conveyor means disposed adjacent to the discharge end of each slicer knife means, said last named conveyor means providing a plurality of paths extending from the upper and the lower levels of the slicer to a common level, the paths in each level diverging away from the slicer knife means.

9. In combination, a plurality of slitting discs disposed in horizontal linear spaced relationship and adapted to rotate in parallel vertical planes, a slicer spaced from the discs in a direction lengthwise of said planes and provided with a plurality of slicing platforms one disposed above the other, slicer knife means above each platform, conveyor means disposed from the slitting discs to positions adjacent each slicing platform, conveyor means passing to each platform of the slicer from said first mentioned conveyor means, conveyor means disposed adjacent to the discharge end of each slicer knife means, said last named conveyor means providing a plurality of conveyor belts disposed in a plane extending from the upper platform and a plurality of conveyor belts disposed in a plane extending from the lower platform, all of such conveyor belts diverging away from the slicer knife means and merging into a common plane.

10. The combination of a conveyor movable horizontally, a knife disposed above and extending transversely to the direction of movement of the conveyor, a support for the knife independent of the conveyor means imparting vertical and horizontal movement to the knife, the horizontal movement being parallel to the direction of movement of the conveyor, and separate means reciprocating the knife in a transverse direction with respect to the movement of the conveyor.

11. The combination of a conveyor movable horizontally, a knife disposed above and extending transversely to the direction of movement of the conveyor, a support for the knife independent of the conveyor means mounting the knife for vertical and horizontal movement in a direction parallel to the direction of movement of the conveyor, means driving the conveyor and moving the knife in its horizontal direction at the same rate of speed, means mounting the knife for reciprocating movement in a transverse direction with respect to the movement of the conveyor, and means independent of the driving means for reciprocating the knife.

12. The combination of a conveyor movable horizontally, a knife disposed above and extending transversely to the direction of movement of the conveyor, a support for the knife independent of the conveyor, means providing an orbital path for the knife so as to impart vertical and horizontal movement to the knife, the horizontal movement being parallel to the direction of movement of the conveyor, the orbital path comprising an upper and a lower run, the lower run being in the direction of travel of the conveyor and the upper run being in the opposite direction, and separate means mounting the knife for reciprocation transversely of the conveyor.

13. In combination, a plurality of slitting knives disposed in horizontal linear spaced relationship with cutting edges disposed in parallel vertical planes, a slicer spaced from the knives in a direction lengthwise of said planes and provided with a plurality of separate, spaced apart, slicing platforms, slicer knife means adjacent to each platform, conveyor means extending from the slitting knives to each slicing platform, and conveyor means extending from each slicing platform to a common platform.

14. A slicing machine comprising a slicing platform, conveyor means adapted to move material to be sliced across the platform, a slicing knife disposed crosswise with respect to the direction of movement of the material and above the conveyor means and over the platform, the slicing knife being mounted to move upwardly and downwardly with respect to the platform and to reciprocate lengthwise of the knife, driving means for imparting the upward and downward movement of the slicing knife, and separate driving means for imparting the reciprocating motion to the slicing knife.

15. A slicing machine comprising a slicing platform, conveyor means adapted to move material to be sliced across the platform, a slicer knife assembly mounted above the conveyor means and over the platform, mounting means for the assembly providing an orbital path in a vertical direction above the platform, means driving the assembly through the orbital path, the assembly comprising a slicing knife disposed transversely across the platform, mounting means for the knife providing reciprocating motion of the knife in a lengthwise direction of the knife, and separate driving means for reciprocating the knife.

16. In combination, a plurality of slitting discs disposed in horizontal linear spaced relationship and adapted to rotate in parallel vertical planes, a slicer spaced from the discs in a direction lengthwise of said planes and provided with a plurality of slicing platforms arranged at different positions, slicer knife means above each platform, conveyor means extending from the slitting discs to each slicing platform and conveyor means extending from each slicing platform to a common position.

ROBERT F. MORRISON.

REFERENCES CITED

The following references are of record in the file of this patent:

UNITED STATES PATENTS

| Number | Name | Date |
|---|---|---|
| 1,230,288 | Gabriel et al. | June 19, 1917 |
| 1,527,262 | Martin | Feb. 24, 1925 |
| 1,839,050 | Ponisch | Dec. 29, 1931 |
| 2,109,812 | Whitefield | Mar. 1, 1938 |
| 2,141,859 | Green | Dec. 27, 1938 |
| 2,345,637 | Stiles | Apr. 4, 1944 |